United States Patent
Hwang et al.

(10) Patent No.: US 9,980,013 B2
(45) Date of Patent: May 22, 2018

(54) METHOD AND APPARATUS FOR TRANSMITTING AND RECEIVING BROADCAST SIGNAL FOR 3D BROADCASTING SERVICE

(71) Applicant: LG ELECTRONICS INC., Seoul (KR)

(72) Inventors: Soojin Hwang, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/319,648

(22) PCT Filed: Jul. 7, 2015

(86) PCT No.: PCT/KR2015/007006
§ 371 (c)(1),
(2) Date: Dec. 16, 2016

(87) PCT Pub. No.: WO2016/006913
PCT Pub. Date: Jan. 14, 2016

(65) Prior Publication Data
US 2017/0188118 A1 Jun. 29, 2017

Related U.S. Application Data

(60) Provisional application No. 62/021,724, filed on Jul. 8, 2014.

(51) Int. Cl.
*H04N 21/81* (2011.01)
*H04N 21/6379* (2011.01)
(Continued)

(52) U.S. Cl.
CPC ....... *H04N 21/816* (2013.01); *H04N 13/0022* (2013.01); *H04N 13/0048* (2013.01);
(Continued)

(58) Field of Classification Search
None
See application file for complete search history.

(56) References Cited

U.S. PATENT DOCUMENTS

2015/0245063 A1* 8/2015 Rusanovskyy ...... H04N 19/597
375/240.12

FOREIGN PATENT DOCUMENTS

JP 2012138856 A 7/2012
KR 1020110064093 A 6/2011
(Continued)

*Primary Examiner* — Omar S Parra
(74) *Attorney, Agent, or Firm* — Dentons US LLP

(57) ABSTRACT

The present invention relates to a method and/or apparatus for transmitting and receiving a broadcast signal for a three-dimensional (3D) broadcasting service. A broadcast signal transmission method according to an embodiment of the present invention comprises the steps of: encoding each of packing frames, in which at least one frame among a left image frame, a right image frame, a depth map frame for the left image, and a depth map frame for the right image is packed, and signaling information for the packing frames; and generating a broadcast signal including the encoded packing frames and signaling information; and transmitting the generated broadcast signal.

13 Claims, 18 Drawing Sheets

| Syntax | Descriptor |
|---|---|
| frame_packing_composition_info ( ) { | |
|     texture_resolution | u(4) |
|     texture_frame_rate | u(4) |
|     texture_chroma_sub_sampling | u(2) |
|     texture_bit_depth | u(3) |
|     depth_map_resolution | u(4) |
|     depth_frame_rate | u(4) |
|     depth_map_bit_depth | u(3) |
|     pixel_composition_info() | |
| } | |

(51) Int. Cl.
*H04N 13/00* (2018.01)
*H04N 21/61* (2011.01)

(52) U.S. Cl.
CPC ..... *H04N 21/6106* (2013.01); *H04N 21/6379* (2013.01); *H04N 2013/0081* (2013.01)

(56) References Cited

FOREIGN PATENT DOCUMENTS

| | | | |
|---|---|---|---|
| KR | 10-2013-0059642 | A | 6/2013 |
| KR | 1020140004209 | A | 1/2014 |
| KR | 1020140016236 | A | 2/2014 |
| WO | 2014025239 | A1 | 2/2014 |

\* cited by examiner

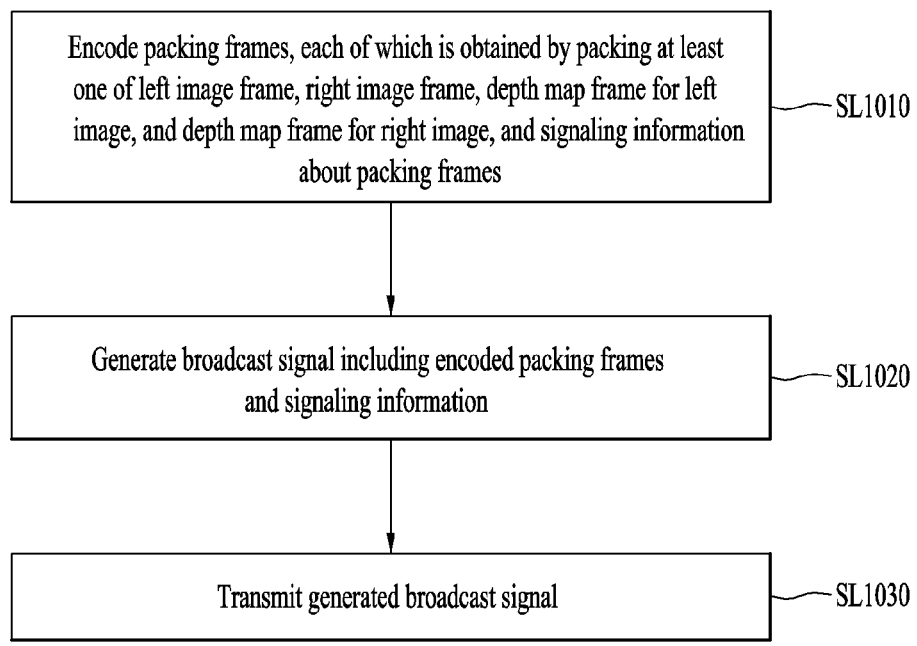

FIG. 2

| Case # | Source | | Container format | Description |
|---|---|---|---|---|
| | Texture (L/R) | Depth (L/R) | | |
| 1-1 | 2K, 8bit, 4:2:0 | 2K, 10bit | 4K, 8bit, 4:2:0 | |
| 1-2 | 2K, 10bit, 4:2:0 | 2K, 12bit | 4K, 10bit, 4:2:0 | Example of page 2, Container space remains |
| 1-3 | 2K, 10bit, 4:2:0 | 2K, 14bit | 4K, 10bit, 4:2:0 | Container space remains |
| 1-4 | 2K, 10bit, 4:2:0 | 2K, 15bit | 4K, 10bit, 4:2:0 | Example of page 2 |
| 2-1 | 4K, 8bit, 4:2:0 | 2K, 12bit | 4K, 10bit, 4:2:0 | |
| 2-2 | 4K, 8bit, 4:2:0 | 4K, 8bit | 4K, 10bit, 4:2:2 | Example of page 4 |
| 2-3 | 4K, 10bit, 4:2:0 | 2K, 16bit | 4K, 10bit, 4:2:2 | Depth map: 2K. 10/12/14/16 bits are includable |
| 2-4 | 4K, 10bit, 4:2:0 | 2K, 12bit | 4K, 12bit, 4:2:0 | Example of page 4 |
| 2-5 | 4K, 10bit, 4:2:0 | 4K, 9bit | 4K, 12bit, 4:2:2 | Q〉Depth map: 4K. 8 bits are includable |
| 2-6 | 4K, 10bit, 4:2:0 | 2K, 16bit | 4K, 14bit, 4:2:0 | Container format is not provided as profile in HEVC |
| 2-7 | 4K, 10bit, 4:2:0 | 4K, 8bit | 4K, 14bit, 4:2:2 | Container format is not provided as profile in HEVC. Container space remains |
| 2-8 | 4K, 10bit, 4:2:0 | 4K, 15bit | 4K, 10bit, 4:4:4 | |

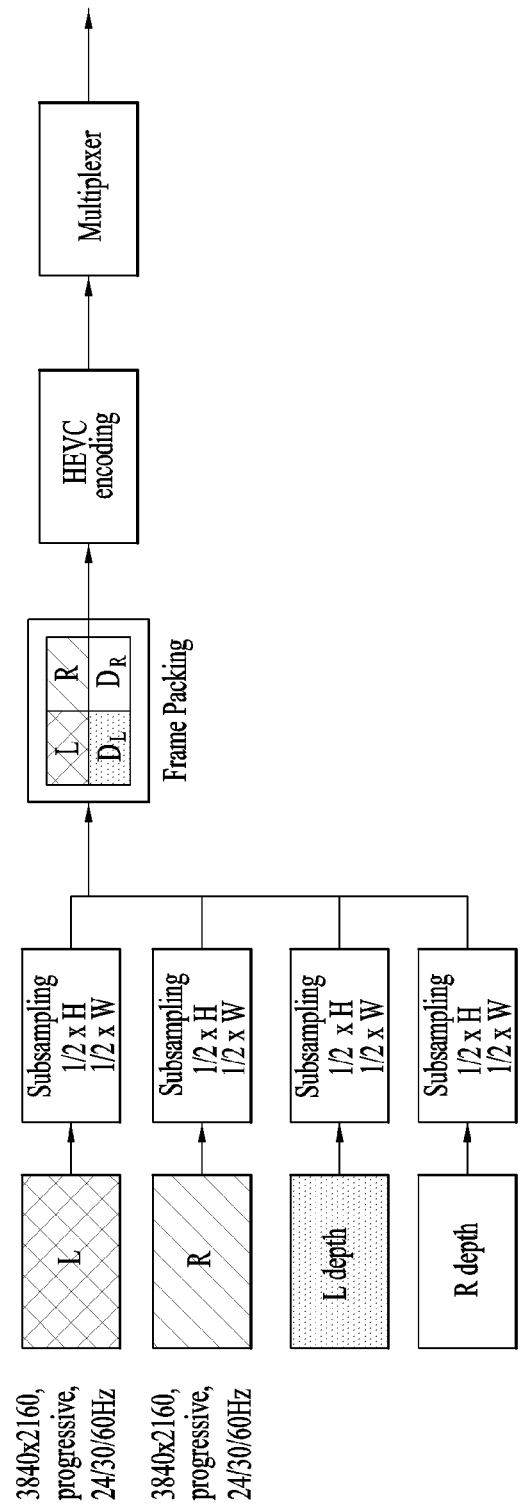

FIG. 5

```
for (n=0; n< c_bit_depth; n++) {
    Y'[n] = Y[n]
    Cb'[n] = Cb[n]
    Cr'[n] = Cr[n]
}
```
L5010

```
for (n=0; n< c_bit_depth; n++)
    Y(0...3)'[n] = D(0...3)[n]

for (n=0; n< d_bit_depth - c_bit_depth; n++) {
    Cb(0)'[n] = D0[c_bit_depth + n]
    Cb(0)'[d_bit_depth - c_bit_depth + n] = D1[c_bit_depth + n]
    Cr(0)'[n] = D2[c_bit_depth + n]
    Cr(0)'[d_bit_depth - c_bit_depth + n] = D3[c_bit_depth + n]
}
```
L5020

FIG. 8

L8010
```
for (n=0; n< t_bit_depth ; n++) {
    Y'[n] = Y[n]
    Cb'[n] = Cb[n]
    Cr'[n] = Cr[n]
}
```

L8020
```
for (n=0; n< c_bit_depth - t_bit_depth ; n++) {
    Y0'[n + t_bit_depth] = D[n]
    Y1'[n + t_bit_depth] = D[n + (c_bit_depth - t_bit_depth)]
    Y2'[n + t_bit_depth] = D[n + 2*(c_bit_depth - t_bit_depth)]
    Y3'[n + t_bit_depth] = D[n + 3*(c_bit_depth - t_bit_depth)]
    Cb0'[n + t_bit_depth] = D[n + 4*(c_bit_depth - t_bit_depth)]
    Cr0'[n + t_bit_depth] = D[n + 5*(c_bit_depth - t_bit_depth)]
}
```

FIG. 12

| | Descriptor |
|---|---|
| frame_packing_arrangement_for_auto_stereoscopic(payloadSize) { | |
| frame_packing_arrangement_id | ue(v) |
| frame_packing_arrangement_cancel_flag | u(1) |
| if(!frame_packing_arrangement_cancel_flag){ | |
| frame_packing_arrangement_type_for_auto_stereoscopic | u(7) |
| quincunx_sampling_flag | u(1) |
| content_interpretation_type | u(1) |
| spatial_flipping_flag | u(1) |
| frame0_flipped_flag | u(1) |
| field_views_flag | u(1) |
| current_frame_is_frame0_flag | u(1) |
| frame0_self_contained_flag | u(1) |
| frame1_self_contained_flag | u(1) |
| if(!quincunx_sampling_flag && frame_packing_arrangement_type_for_auto_stereoscopic != 5) { | |
| frame0_grid_position_x | u(4) |
| frame0_grid_position_y | u(4) |
| frame1_grid_position_x | u(4) |
| frame1_grid_position_y | u(4) |
| } | |
| frame_packing_composition_info() | u(8) |
| frame_packing_arrangement_persistence_flag | u(1) |
| } | |
| upsampled_aspect_ratio_flag | u(1) |
| } | |

L12010

| frame_packing_arrangement_type_for_auto_stereoscopic | Interpretation |
|---|---|
| 1 | Expansion of existing frame_packing_arrangement_type 3 (side-by-side) e.g., image is divided into 4 regions as texture (side-by-side)+depth map (side-by-side) arrangement |
| 2 | Expansion of existing frame_packing_arrangement_type 4 (top-bottom) e.g., image is divided into 4 regions as texture (top-bottom)+depth map (top-bottom) arrangement |
| 3 | Expansion of existing frame_packing_arrangement_type 5 (time interleaving) e.g., Odd frame: Left/left depth is arranged side-by-side (or top-and-bottom etc.) and image in one frame is divided into 2 regions. Even frame: Right/right depth is arranged side-by-side (or top-and-bottom etc. |
| 4 | Expansion of frame packing arrangement included in existing segmented rectangular frame packing arrangement SEI message e.g., Depth map is configured in rectangular region arrangement in which left image of 720p is inserted into 1920x1080 frame without scaling process and right image is segment-arranged in remaining position after arranging left image. |

| Syntax | Descriptor |
|---|---|
| frame_packing_composition_info ( ) { | |
|     texture_resolution | u(4) |
|     texture_frame_rate | u(4) |
|     texture_chroma_sub_sampling | u(2) |
|     texture_bit_depth | u(3) |
|     depth_map_resolution | u(4) |
|     depth_frame_rate | u(4) |
|     depth_map_bit_depth | u(3) |
|     pixel_composition_info() | |
| } | |

FIG. 14

| Syntax | Descriptor |
|---|---|
| 3D_operating_point ( ) { | |
|     service_type | 2 |
|     service_frame_rate | 3 |
|     max_temporal_id | 3 |
|     for(i=0;i<max_temporal_id;i++){ | |
|         temporal_id | 3 |
|         layer_type | 1 |
|         If(layer_type = 0) t_layer_dependency | 4 |
|         else d_layer_dependency | 4 |
|         } | |
|     } | |
|     reserved | 5 |
|     num_of_operating_points | 3 |
|     for(i=0;i<num_of_operating_points;i++){ | |
|         layer_combination_type | 8 |
|         layer_composition_info ( ) | |
|     } | |
| } | |

FIG. 15

| Temporal ID | 0 | 1 | 2 | 3 | 4 | 5 | 6 | 7 |
|---|---|---|---|---|---|---|---|---|
| Corresponding layer included/not included | O | O | O | O | X | X | X | X |
| layer_combination_type | 1 | 1 | 1 | 1 | O | O | O | O |

METHOD AND APPARATUS FOR TRANSMITTING AND RECEIVING BROADCAST SIGNAL FOR 3D BROADCASTING SERVICE

This application is a U.S. National Phase Application under 35 U.S.C. § 371 of International Application PCT/KR2015/007006, filed on Jul. 7, 2015, which claims the benefit of U.S. Provisional Application No. 62/021,724, filed on Jul. 8, 2014, the entire content of the prior applications is hereby incorporated by reference.

TECHNICAL FIELD

The present invention relates to transmission and reception of a broadcast signal. More specifically, the present invention relates to a method and/or apparatus for transmitting and receiving a broadcast signal for a 3-dimensional (3D) broadcast service.

BACKGROUND ART

Generally, a 3D image provides a stereoscopic sense using the stereoscopic visual principle of both eyes. Since human depth perception is based upon binocular parallax caused by a distance between the eyes separated by about 65 mm, the 3D image enables both right and left eyes to view respective associated plane images, thereby providing the stereoscopic sense and depth sense. A method of displaying such a 3D image may be classified into a stereoscopic scheme, a volumetric scheme, a holographic scheme, etc. In case of the stereoscopic scheme, a left view image to be viewed by the left eye and a right view image to be viewed by the right eye are provided so that the left eye views the left view image and the right eye views the right view image through polarized glasses or a display device, resulting in recognition of the 3D image effect.

Advances in digital and communication technology have rapidly expanded spread and demand for audio- and video-centered multimedia content in various fields such as the Internet and personal media as well as broadcast and films. Further, as a 3D television (TV) broadcast/3D film that provides the stereoscopic sense has been widely adopted, user demand for realistic media that provide sense of reality and sense of presence has increased. In addition, as display technology has developed and a TV in a household has adopted a larger screen, demand for realistic content of a high definition (HD) level or more has increased. Accordingly, in preparation for a post-HDTV market, realistic broadcast such as ultra high definition TV (UHDTV) has drawn attraction as a next-generation broadcast service along with 3DTV. In particular, discussion about an ultra high definition (UHD) broadcast service has been increasing.

Meanwhile, as a 3DTV has been widely used, spread of 3D image content through a storage medium and transmission of 3D image content through digital broadcast has been on the increase.

Furthermore, advances in production and transmission technology of a UHD image require technology for efficiently transmitting a left image, a right image, a depth map for the left image, and a depth map for the right image that constitute a 3D image.

DETAILED DESCRIPTION OF THE INVENTION

Technical Problems

An object of the present invention is to provide a method of efficiently transmitting 3D content using a UHD-level transmission frame.

Another object of the present invention is to provide a method of transmitting 3D content and 2D content using the same transmission frame.

Another object of the present invention is to provide a method of transmitting 3D content using a temporal scalability coding scheme.

Technical Solutions

According to an aspect of the present invention, provided herein is a method of transmitting a broadcast signal, including encoding packing frames, each of which is obtained by packing at least one of a left image frame, a right image frame, a depth map frame for a left image, and a depth map frame for a right image, and signaling information about the packing frames, generating a broadcast signal including the encoded packing frames and signaling information, and transmitting the generated broadcast signal.

The encoding may include encoding a texture packing frame obtained by packing the left image frame and the right image frame and a depth map packing frame obtained by packing the depth map frame for the left image and the depth map frame for the right image, among the packing frames, to different layers.

The signaling information may includes frame packing arrangement information indicating how the packing frames are configured, the frame packing arrangement information may include information about arrangement types of the packing frames, and the arrangement types may include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

The frame packing arrangement information may include frame packing composition information including information about formats of the left image frame, the right image frame, the depth map frame for the left image, and the depth map frame for the right image.

The frame packing composition information may include information as to how each component in a color space for each pixel constituting the packing frames is configured.

The signaling information may include 3-dimensional (3D) operating point information indicating information about a service for transmitting the texture packing frame and depth map packing frame by different layers, and the 3D operating point information may include information for identifying whether a current service is a service for transmitting the texture packing frame and the depth map packing frame by different layers and information as to whether each layer included in a service includes the texture packing frame or the depth map packing frame.

In another aspect of the present invention, provided herein is a method of receiving a broadcast signal, including receiving a stream for packing frames, each of which is obtained by packing at least one of a left image frame, a right image frame, a depth map frame for a left image, and a depth map frame for a right image, and signaling information about the packing frames; and decoding the received stream for the packing frames using the signaling information.

A texture packing frame obtained by packing the left image frame and the right image frame and a depth map packing frame obtained by packing the depth map frame for the left image and the depth map frame for the right image, among the packing frames, may be transmitted in different layers.

The signaling information may include frame packing arrangement information indicating how the packing frames are configured, the frame packing arrangement information may include information about arrangement types of the packing frames, and the arrangement types include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

The frame packing arrangement information may include frame packing composition information including information about formats of the left image frame, the right image frame, the depth map frame for the left image, and the depth map frame for the right image.

The frame packing composition information may include information as to how each component in a color space for each pixel constituting the packing frames is configured.

The signaling information may include 3-dimensional (3D) operating point information indicating information about a service for transmitting the texture packing frame and depth map packing frame by different layers, and the 3D operating point information may include information for identifying whether a current service is a service for transmitting the texture packing frame and the depth map packing frame by different layers and information as to whether each layer included in a service includes the texture packing frame or the depth map packing frame.

In another aspect of the present invention, provided herein is an apparatus for transmitting a broadcast signal, including an encoder configured to encode packing frames, each of which is obtained by packing at least one of a left image frame, a right image frame, a depth map frame for a left image, and a depth map frame for a right image, and signaling information about the packing frames, a broadcast signal generator configured to generate a broadcast signal including the encoded packing frames and signaling information, and a transmitter configured to transmit the generated broadcast signal.

The encoder may encode a texture packing frame obtained by packing the left image frame and the right image frame and a depth map packing frame obtained by packing the depth map frame for the left image and the depth map frame for the right image, among the packing frames, to different layers.

In another aspect of the present invention, provided herein is an apparatus for receiving a broadcast signal, including a receiver configured to receive a stream for packing frames, each of which is obtained by packing at least one of a left image frame, a right image frame, a depth map frame for a left image, and a depth map frame for a right image, and signaling information about the packing frames, and a decoder configured to decode the received stream for the packing frames using the signaling information.

Advantageous Effects

According to the present invention, 3D content can be efficiently provided using a UHD-level transmission frame.

According to the present invention, 3D content and 2D content can be transmitted using the same transmission frame.

According to the present invention, 3D content can be transmitted using a temporal scalability coding scheme.

DESCRIPTION OF DRAWINGS

FIG. 1 is a view illustrating a broadcast signal transmission method according to an embodiment of the present invention.

FIG. 2 is a view illustrating a frame packing arrangement method according to an embodiment of the present invention.

FIG. 3 is a diagram illustrating a method of packing a 2K left image, a 2K right image, a 2K depth map for the left image, and a 2K depth map for the right image into one 4K frame according to an embodiment (Case 1) of the present invention.

FIG. 5 is a view illustrating equations used to map a texture image and a depth map to a container frame in units of bits according to an embodiment (Case 1) of the present invention.

FIG. 8 is a view illustrating equations used to map a texture image and a depth map to a container frame in units of bits according to an embodiment (Case 2) of the present invention.

FIG. 12 is a view illustrating configuration of a frame_packing_arrangement_for_auto_stereoscopic SEI message and a frame_packing_arrangement_type_for_auto_stereoscopic field value according to an embodiment of the present invention.

FIG. 13 is a view illustrating configuration of frame_packing_composition_info( ) according to an embodiment of the present invention.

FIG. 14 is a view illustrating configuration of 3D_operating_point( ) according to an embodiment of the present invention.

FIG. 15 is a view illustrating layer_combination_type according to an embodiment of the present invention.

BEST MODE FOR CARRYING OUT THE INVENTION

Figure 4:
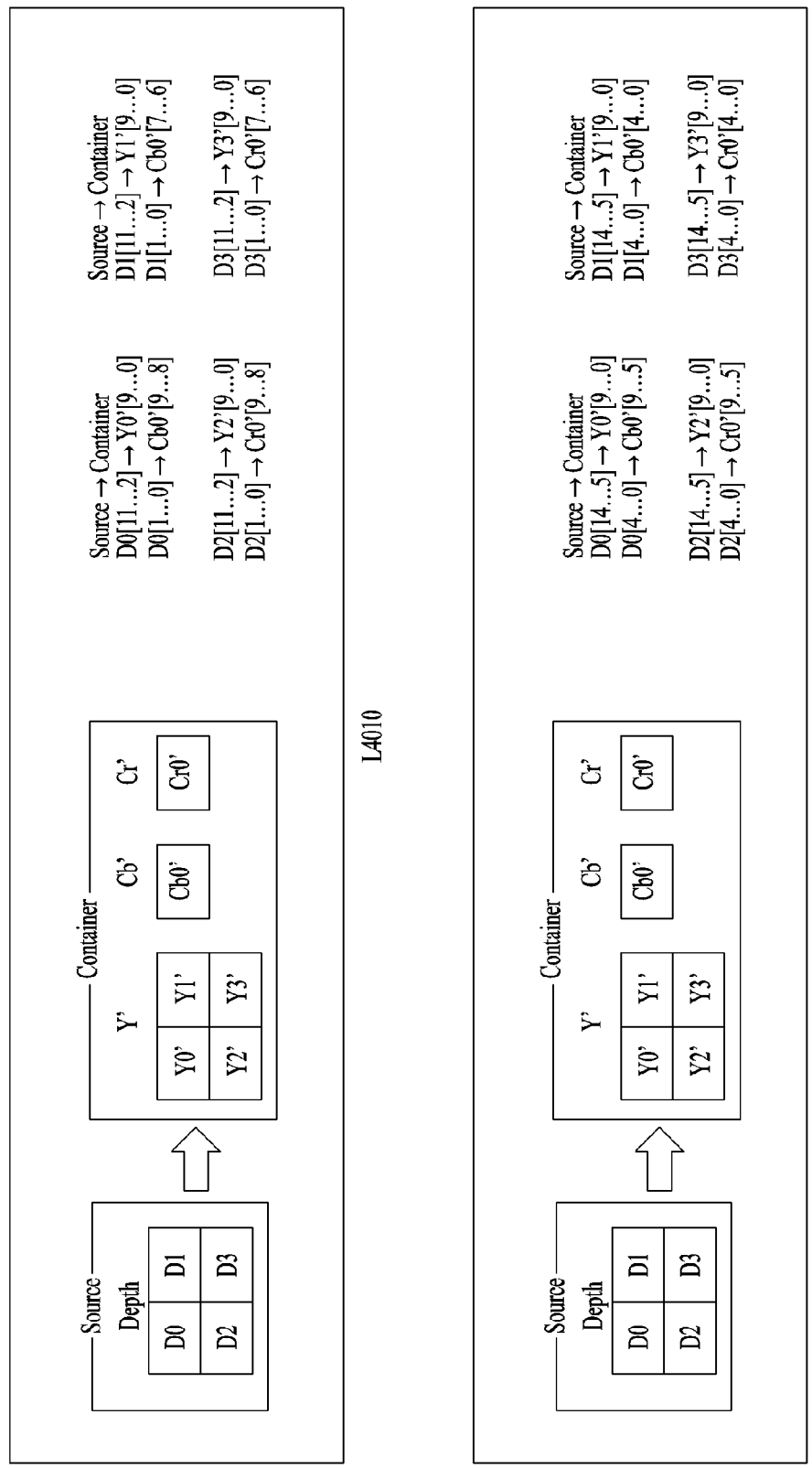
FIG. 4 is a view illustrating a method of packing a texture image (2K, 10 bits, 4:2:0) and a depth map (2K, 12 bits/2K, 15 bits) into a container (4K, 10 bits, 4:2:0) according to an embodiment (Case 1-2 and Case 1-4) of the present invention.

Reference will now be made in detail to the exemplary embodiments of the present invention, examples of which are illustrated in the accompanying drawings. The present invention should not be limited to the specific embodiments described herein.

Most terms disclosed in the present invention are defined in consideration of functions of the present invention and correspond to general terms well known in the art and may vary according to intention of those skilled in the art, usual practices, or introduction of new technologies. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the content of this specification rather than their simple names or meanings.

FIG. 1 is a view illustrating a broadcast signal transmission method according to an embodiment of the present invention.

The broadcast signal transmission method according to an embodiment of the present invention includes encoding packing frames, each of which is obtained by packing at least one of a left image frame, a right image frame, a depth map frame for a left image, and a depth map frame for a right image, and signaling information about the packing frames (SL1010), generating a broadcast signal including the encoded packing frames and signaling information (SL1020), and/or transmitting the generated broadcast signal (SL1030). Herein, the packing frames may be referred to as transmission frames or container frames. A detailed description thereof will be given with reference to FIGS. 3, 4, 5, 6, 7, 8, and 16.

According to another embodiment of the present invention, the encoding may include encoding a texture packing frame obtained by packing the left image frame and the right image frame and a depth map packing frame obtained by packing the depth map frame for the left image and the depth map frame for the right image, among the packing frames, to different layers. Herein, the different layers may mean different streams. In this case, a texture image may mean a left image and/or a right image. This will be described in detail with reference to FIGS. 9, 10, 11, and 17.

According to another embodiment of the present invention, the signaling information may include frame packing arrangement information indicating how the packing frames are configured. The frame packing arrangement information may include information about arrangement types of the packing frames. The arrangement types may include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and/or a type of arranging the left image and the depth map for the left image in a vertical or horizontal direction in an odd packing frame divided into two regions and arranging the right image and the depth map for the right image in a horizontal or vertical direction in an even packing frame divided into two regions. Herein, the frame packing arrangement information may indicate Frame_packing_arrangement_for_auto_stereoscopic( ). The information about arrangement types of the packing frames may indicate frame_packing_arrangement_type_for_auto_stereoscopic. The arrangement types may indicate side-by-side, top-and-bottom, and time interleaving types. A detailed description thereof will be given later with reference to FIG. 12.

According to another embodiment of the present invention, the frame packing arrangement information may include frame packing composition information including information about formats of the left image frame, the right image frame, the depth map frame for the left image, and/or the depth map frame for the right image. The frame packing composition information may indicate frame_packing_composition_info( ). A detailed description thereof will be given later with reference to FIG. 13.

According to another embodiment of the present invention, the frame packing composition information may include information as to how each component in a color space for each pixel constituting the packing frames is configured. Herein, the information as to how each component in a color space for each pixel constituting the packing frames is configured may indicate pixel_composition_info( ). Each component in the color space may include YCbCr. A detailed description thereof will be given later with reference to FIG. 13.

According to another embodiment of the present invention, the signaling information may include 3D operating point information indicating information about a service for transmitting the texture packing frame and depth map packing frame by different layers and the 3D operating point information may include information for identifying whether a current service is a service for transmitting the texture packing frame and the depth map packing frame by different layers and/or information as to whether each layer included in a service includes the texture packing frame or the depth map packing frame. The 3D operating point information may indicate 3D_operating_point( ). The information for identifying whether the current service is a service for transmitting the texture packing frame and the depth map packing frame by different layers may indicate service_type. The information as to whether each layer included in a service includes the texture packing frame or the depth map packing frame may indicate layer_type. A detailed description thereof will be given later with reference to FIG. 14.

FIG. 2 is a view illustrating a frame packing arrangement method according to an embodiment of the present invention.

According to an embodiment of the present invention, a left image, a right image, and a depth map may be transmitted in one frame having a 4K UHD format in order to provide a glasses-free 3D service. According to an embodiment of the present invention, in order to provide a glasses-free 3D service, the depth map may be transmitted in a layer for high efficiency video coding (HEVC) temporal scalability.

According to an embodiment (Case 1) of the present invention, a 2K left image, a 2K right image, a 2K depth map for the left image, and a 2K depth map for the right image may be packed into one 4K frame. In this case, downsampling is performed on the texture image and the depth map and then the downsampled texture image and depth map may be packed into the 4K frame. Herein, the texture image means an image other than the depth map and may be the left image and/or the right image. Downsampling may represent subsampling.

According to another embodiment (Case 2) of the present invention, a 4K left image, a 4K right image, a 4K depth map for the left image, and a 4K depth map for the right image may be packed into one 4K frame. Alternatively, a 4K left image, a 4K right image, a 2K depth map for the left image, and a 2K depth map for the right image may be packed into one 4K frame. In this case, the texture image may have a resolution of 4K and the depth map may be downsampled and then packed into the 4K frame.

According to another embodiment (Case 3) of the present invention, a depth map may be transmitted in a layer for HEVC temporal scalability.

While the aforementioned or later-described embodiments of the present invention describe a method of packing a texture image and/or a depth map into a 4K frame, embodiments of the present invention may be applied to packing into a frame having another resolution.

FIG. 2 illustrates a texture image format, a depth map format, and/or a container format according to case number (Case #) indicating each embodiment. The texture image format may include resolution, bit depth, and/or chroma subsampling. The depth map format may include resolution and/or bit depth. The container format may include resolution, bit depth, and/or chroma subsampling. The texture image format and/or the depth map format may indicate a source format.

Case 1-1 according to an embodiment of the present invention may indicate a method of packing a texture image having a resolution of 2K, a bit depth of 8 bits, and a chroma subsampling of 4:2:0 and a depth map having a resolution of 2K and a bit depth of 10 bits into a container frame having a resolution of 4K, a bit depth of 8 bits, and a subsampling of 4:2:0. Case 1-2 according to another embodiment of the present invention may indicate a method of packing a texture image (2K, 10 bits, 4:2:0) and a depth map (2K, 12 bits) into a container (4K, 10 bits, 4:2:0). Case 1-3 according to another embodiment of the present invention may indicate a method of packing a texture image (2K, 10 bits, 4:2:0) and a depth map (2K, 14 bits) into a container (4K, 10 bits, 4:2:0). Case 1-4 according to another embodiment of the present invention may indicate a method of packing a texture image (2K, 10 bits, 4:2:0) and a depth map (2K, 15 bits) into a container (4K, 10 bits, 4:2:0). Case 2-1 according to another embodiment of the present invention may indicate a method of packing a texture image (4K, 8 bits, 4:2:0) and a depth map (2K, 12 bits) into a container (4K, 10 bits, 4:2:0). Case 2-2 according to another embodiment of the present invention may indicate a method of packing a texture image (4K, 8 bits, 4:2:0) and a depth map (4K, 8 bits) into a container (4K, 10 bits, 4:2:2). Case 2-3 according to another embodiment of the present invention may indicate a method of packing a texture image (4K, 10 bits, 4:2:0) and a depth map (2K, 16 bit) into a container (4K, 10 bits, 4:2:2). Case 2-4 according to another embodiment of the present invention may indicate a method of packing a texture image (4K, 10 bits, 4:2:0) and a depth map (2K, 12 bits) into a container (4K, 12 bits, 4:2:0). Case 2-5 according to another embodiment of the present invention may indicate a method of packing a texture image (4K, 10 bits, 4:2:0) and a depth map (4K, 9 bits) into a container (4K, 12 bits, 4:2:2). Case 2-6 according to another embodiment of the present invention may indicate a method of packing a texture image (4K, 10 bits, 4:2:0) and a depth map (2K, 16 bits) into a container (4K, 14 bits, 4:2:0). Case 2-7 according to another embodiment of the present invention may indicate a method of packing a texture image (4K, 10 bits, 4:2:0) and a depth map (4K, 8 bits) into a container (4K, 14 bits, 4:2:2). Case 2-8 according to another embodiment of the present invention may indicate a method of packing a texture image (4K, 10 bits, 4:2:0) and a depth map (4K, 15 bits) into a container (4K, 10 bits, 4:4:4). Herein, in Cases 1-2, 1-3, and 2-7, a bit space of a container may remain. That is, even when all bits of the source format are mapped to the container format, bits that are not mapped may be present among bits constituting the container. In Case 2-3, the depth map may have a bit depth of 10, 12, 14, and/or 16 bits. In Case 2-5, the depth map may have a bit depth of 8 bits. In each of the above-described embodiments of the present invention, even when a bit depth constituting a depth map format is lower than the illustrated bit depth, the same embodiment may be applied. According to another embodiment of the present invention, even when a source format which is not illustrated in the figure is packed into a container format which is not illustrated in the figure, the above-described or later-described packing method may be applied.

FIG. 3 is a diagram illustrating a method of packing a 2K left image, a 2K right image, a 2K depth map for the left image, and a 2K depth map for the right image into one 4K frame according to an embodiment (Case 1) of the present invention.

In the figure, an embodiment is illustrated in which a 2K left image, a 2K right image, a 2K depth map for the left image, and a 2K depth map for the right image are packed into one 4K container frame in a side-by-side form. In this case, the texture images and/or the depth maps may be packed in a top-and-bottom, time interleaving, and/or rectangular region arrangement form.

Referring to FIG. 3, the texture images may have a resolution of 3840×2160, progressive scanning, and a frame rate of 24/30/60 Hz. Herein, 3840×2160 indicates monitor resolution and has the same meaning as a resolution of 4K. 4K described in this disclosure may mean a resolution of a 4K level as well as accurately indicating a resolution of 3840×2160. 2K described in this disclosure may mean a resolution of a 2K level.

According to an embodiment of the present invention, a left image and a right image having a resolution of 4K, a depth map for the left image, and a depth map for the right image may be downsampled to ½ width and ½ height. The downsampled texture images and depth maps have a resolution of 2K and may be packed into one 4K container frame in a side-by-side form as shown. The packed 4K container frame may be HEVC-encoded, multiplexed, and then transmitted to a receiver.

FIG. 4 is a view illustrating a method of packing a texture image (2K, 10 bits, 4:2:0) and a depth map (2K, 12 bits/2K, 15 bits) into a container (4K, 10 bits, 4:2:0) according to an embodiment (Case 1-2 and Case 1-4) of the present invention.

In this figure, a method is illustrated of mapping YCbCr of each pixel constituting the texture image and a depth value of each pixel constituting the depth map to Y'Cb'Cr' of the container, when a container format is divided into 4 regions as in an embodiment (Case 1) of the present invention (in this case, the container format and a source texture image may have the same profile and different levels). One smallest box illustrated in FIG. 4 may represent one pixel. A number denoted together with a text in one smallest box may represent a relative pixel number. That is, in a container frame, a 0th pixel may have all of Y', Cb', and Cr' but 1st, 2nd, and 3rd pixels may have only Y' without Cb' and Cr'.

According to an embodiment (Case 1) of the present invention, YCbCr of each pixel constituting a source texture image may be sequentially mapped to Y'Cb'Cr' of each pixel constituting the container frame without change. An equation for this process is indicated in an upper box L5010 of the next figure. In this equation, n denotes bit depth constituting one pixel. For example, if the texture image has a bit depth of 8 bits, n may have a value varying from 0 to 7. In addition, c_bit_depth indicates a maximum bit depth capable of being stored in the container frame, YCbCr indicates YCbCr of the texture image, and Y'Cb'Cr' indicates YCbCr of the container frame.

According to an embodiment (Case 1) of the present invention, a depth value D(0, . . . , 3) of each pixel constituting a source depth map may be mapped first to Y'(0, . . . , 3) of each pixel constituting the container frame and the remaining bits of the depth value may be mapped to Cb' and/or Cr' of each pixel constituting the container frame. In this case, a bit space may remain in Y'Cb'Cr' of each pixel constituting the container frame and the remaining bit space may be emptied. An equation for this process is indicated in a low box L5020 of the next figure. In this equation, n denotes bit depth constituting one pixel. For example, if a texture image has a bit depth of 8 bits, n may have a value varying from 0 to 7. In addition, c_bit_depth indicates a maximum hit depth capable of being stored in the container frame, YCbCr indicates YCbCr of the texture image, Y'Cb'Cr' indicates YCbCr of the container frame, and d_bit_depth indicates bit depth of depth map. Equation L5020 is an equation of an embodiment different from an embodiment indicated by L4010 and L4020 of FIG. 4.

The upper part L4010 of FIG. 4 illustrates a method of mapping a texture image (2K, 10 bits, 4:2:0) and a depth map (2K 12 bits) to a container (4K, 10 bits, 4:2:0) in units of bits according to an embodiment (Case 1-2) of the present invention. In this figure, YCbCr of each pixel constituting a source texture image may be mapped to Y'Cb'Cr' of a container frame without change. A depth value of each pixel constituting a source depth map may be mapped to Y'Cb'Cr' of a container frame as described below. As illustrated in the upper part L4010, 2nd to 11th bits of D0 may be mapped to 0th to 9th bits of Y0' and 0th and 1st bits of D0 may be mapped to 8th and 9th bits of Cb0'. 2nd to 11th bits of D1 may be mapped to 0th to 9th bits of Y1' and 0th and 1st bits of D1 may be mapped to 6th and 7th bits of Cb0'. 2nd to 11th bits of D2 may be mapped to 0th to 9th bits of Y2' and 0th and 1st bits of D2 may be mapped to 8th and 9th bits of Cr0'. 2nd to 11th bits of D3 may be mapped to 0th to 9th bits of Y3' and 0th and 1st bits of D3 may be mapped to 6th and 7th bits of Cr0'.

The lower part L4020 of FIG. 4 illustrates a method of mapping a texture image (2K, 10 bits, 4:2:0) and a depth map (2K, 15 bits) to a container (4K, 10 bits, 4:2:0) in units of bits according to an embodiment (Case 1-4) of the present invention. In this figure, YCbCr of each pixel constituting a source texture image may be mapped to Y'Cb'Cr' of a container frame without change. A depth value of each pixel constituting a source depth map may be mapped to Y'Cb'Cr' of a container frame as described below. As illustrated in the lower part L4020, 5th to 14th bits of D0 may be mapped to 0th to 9th bits of Y0' and 0th to 4th bits of D0 may be mapped to 5th and 9th bits of Cb0'. 5th to 14th bits of D1 may be mapped to 0th to 9th bits of Y1' and 0th to 4th bits of D1 may be mapped to 0th to 4th bits of Cb0'. 5th to 14th bits of D2 may be mapped to 0th to 9th bits of Y2' and 0th to 4th bits of D2 may be mapped to 5th to 9th bits of Cr0'. 5th to 14th bits of D3 may be mapped to 0th to 9th bits of Y3' and 0th to 4th bits of D3 may be mapped to 0th to 4th bits of Cr0'.

FIG. 5 is a view illustrating equations used to map a texture image and a depth map to a container frame in units of bits according to an embodiment (Case 1) of the present invention.

The equation indicated by the upper part L5010 of the figure is used to map YCbCr of each pixel constituting a source texture image to Y'Cb'Cr' of each pixel constituting a container frame according to an embodiment (Case 1) of the present invention. In this equation, n is bit depth constituting one pixel. For example, if the texture image has a bit depth of 8 bits, n is a variable value from 0 to 7. In addition, c_bit_depth denotes a maximum bit depth capable of being stored in the container frame, YCbCr denotes YCbCr of the texture image, and Y'Cb'Cr' indicates YCbCr of the container frame.

The equation indicated by the lower part L5020 of the figure is used to map a depth value D(0, . . . , 3) of each pixel constituting a source depth map to Y'Cb'Cr' of each pixel constituting the container frame according to an embodiment (Case 1) of the present invention. In this equation, n denotes bit depth constituting one pixel. For example, if the texture image has a bit depth of 8 bits, n may be a variable value from 0 to 7. In addition, c_bit_depth denotes a maximum bit depth capable of being stored in the container frame, YCbCr denotes YCbCr of the texture image, Y'Cb'Cr' denotes YCbCr of the container frame, and d_bit_depth denotes bit depth of the depth map.

Figure 6:
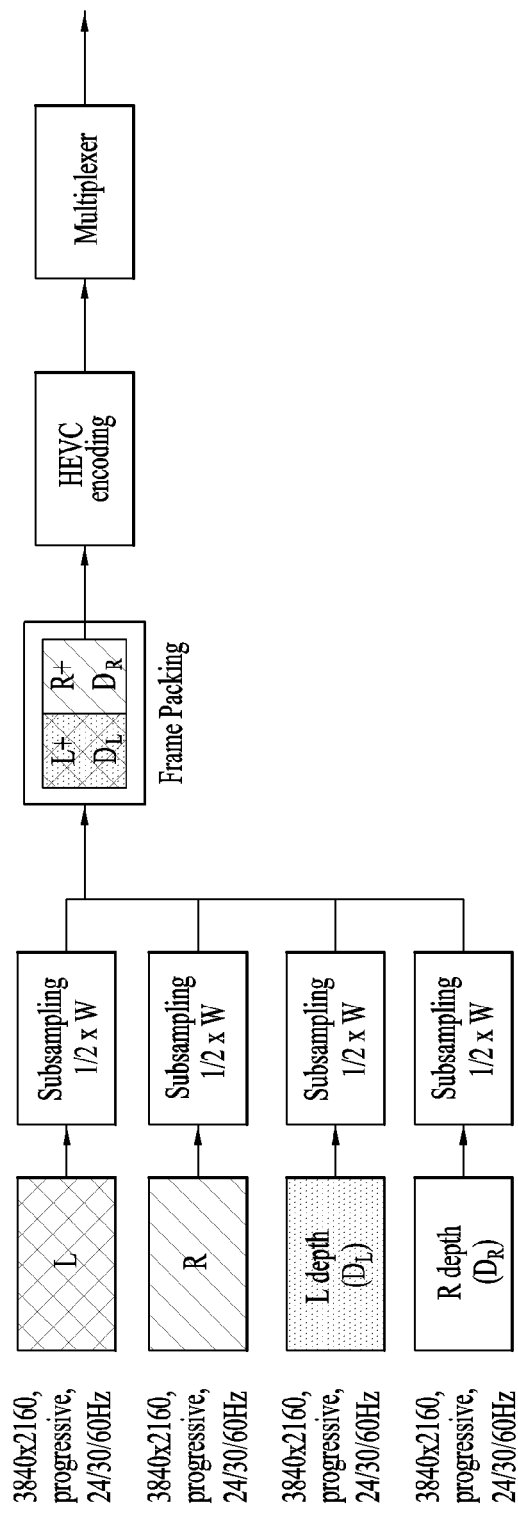
FIG. 6 is a view illustrating a method of packing a 4K left image, a 4K right image, a 4K depth map for the left image, and a 4K depth map for the right image into one 4K frame according to an embodiment (Case 2) of the present invention.

FIG. 6 is a view illustrating a method of packing a 4K left image, a 4K right image, a 4K depth map for the left image, and a 4K depth map for the right image into one 4K frame according to an embodiment (Case 2) of the present invention.

In this figure, an embodiment is illustrated in which a 4K left image, a 4K right image, a 2K or 4K depth map for the left image, and a 2K or 4K depth map for the right image are packed into one 4K container frame in a side-by-side form. In this case, the texture images and/or the depth maps may be packed in a top-and-bottom, time interleaving, and/or rectangular region arrangement form.

Referring to FIG. 6, the texture images may have a resolution of 3840×2160, progressive scanning, and a frame rate of 24/30/60 Hz. Herein, 3840×2160 indicates monitor resolution and has the same meaning as a resolution of 4K.

According to an embodiment of the present invention, the left image and the right image having a resolution of 4K, the depth map for the left image, and the depth map for the right image may be downsampled to a ½ width. The downsampled texture images and depth maps may still have a resolution of 4K and may be packed into one 4K container frame in a side-by-side form as shown. The packed 4K container frame may be HEVC-encoded, multiplexed, and then transmitted to a receiver. When packing is performed in the top-and-bottom form, each image and depth map may be downsampled to ½ height. In other words, a downsampling scheme of each image and depth map may differ according to a packed form.

Figure 7:
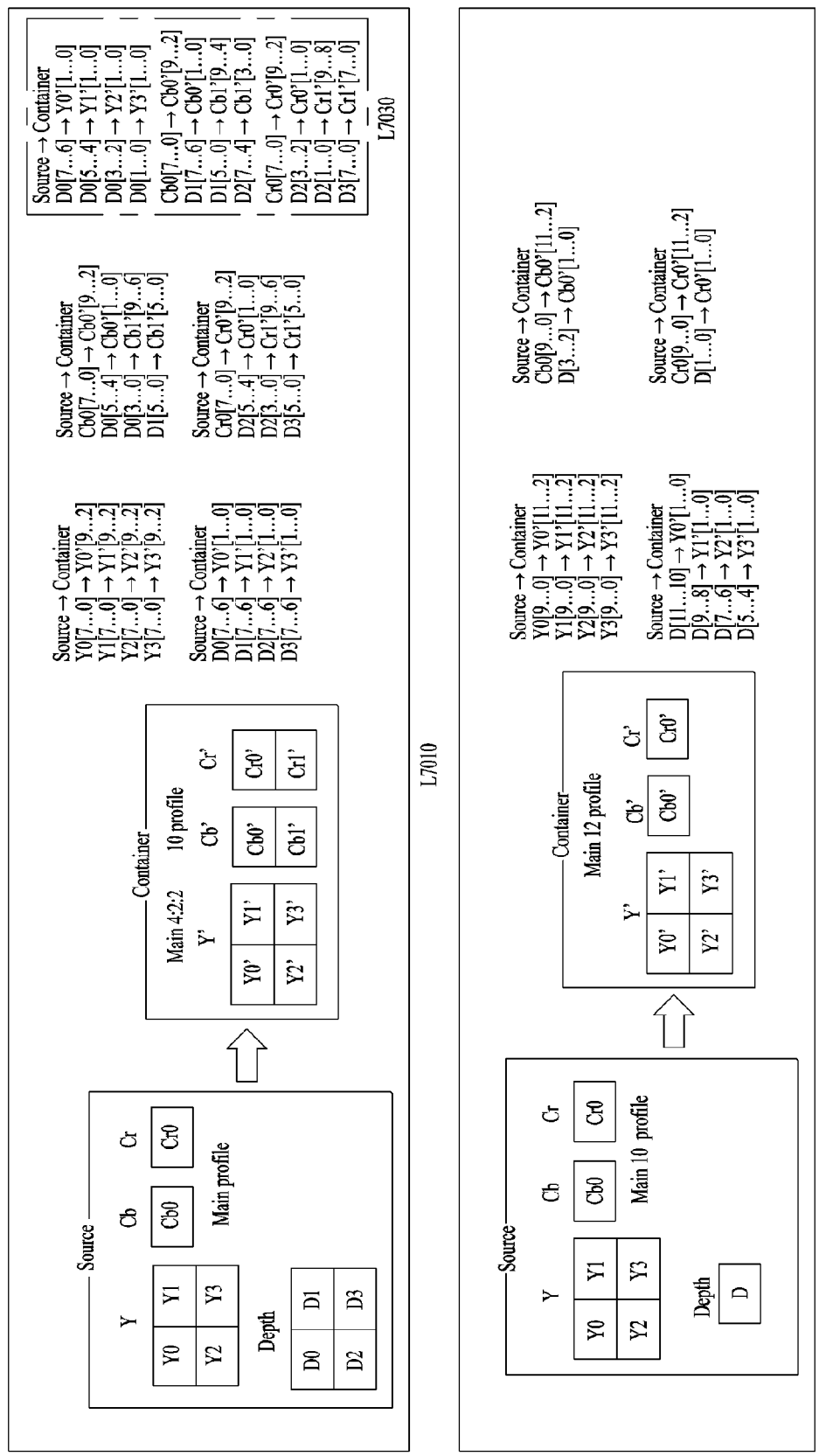
FIG. 7 is a view illustrating a method of packing a texture image (4K, 8 bits, 4:2:0/4K, 10 bits, 4:2:0) and a depth map (4K, 8 bits/2K, 12 bits) into a container (4K, 10 bits, 4:2:2/4K, 12 bits, 4:2:0) according to an embodiment (Case 2-2 and Case 2-4) of the present invention.

FIG. 7 is a view illustrating a method of packing a texture image (4K, 8 bits, 4:2:0/4K, 10 bits, 4:2:0) and a depth map (4K, 8 bits/2K, 12 bits) into a container (4K, 10 bits, 4:2:2/4K, 12 bits, 4:2:0) according to an embodiment (Case 2-2 and Case 2-4) of the present invention.

In this figure, a method is illustrated of mapping YCbCr of each pixel constituting the texture image and a depth value of each pixel constituting the depth map to Y'Cb'Cr' of the container, when a container format is divided into 2 regions (in this case, the container format and a source texture image may have the same resolution and different profiles) as in an embodiment (Case 2) of the present invention. One smallest box illustrated in FIG. 7 may represent one pixel. A number denoted together with a text in one smallest box may represent a relative pixel number. That is, in a container frame, a 0th pixel may have all of Y', Cb', and Cr' but 1st, 2nd, and 3rd pixels may have only Y' without Cb' and Cr'.

According to an embodiment (Case 2) of the present invention, YCbCr of each pixel constituting a source texture image may be sequentially mapped to Y'Cb'Cr' of each pixel constituting the container frame without change. An equation for this process is indicated in an upper box L8010 of the next figure. In this equation, n denotes bit depth constituting one pixel. For example, if a texture image has a bit depth of 8 bits, n may have a value varying from it from 0 to 7. In addition, t_bit_depth indicates bit depth of the text image, YCbCr indicates YCbCr of the texture image, and Y'Cb'Cr' indicates YCbCr of the container frame.

According to an embodiment (Case 2) of the present invention, a depth value of each pixel constituting a source depth map may be mapped to a bit space of Y', Cb', and Cr' which remains after mapping Y, Cb, and Cr of each pixel constituting the texture image. That is, a depth value D(0, . . . , 3) of each pixel constituting a source depth map may be mapped first to the remaining bit space of Y'(0, . . . , 3) of each pixel constituting the container frame and the remaining bits of the depth value may be mapped to the remaining bit space of Cb' and/or Cr' of each pixel constituting the container frame. In this case, a bit space may remain in Y'Cb'Cr' of each pixel constituting the container frame and the remaining bit space may be emptied.

According to an embodiment of the present invention, if a condition of Case 2 is satisfied, resolution of a source depth map is ¼ that of a container format, and chroma subsampling of the container is equal to that of the source texture image, i.e., 4:2:0, a depth value of each pixel constituting the source depth map may be mapped to Y'Cb'Cr' of the container frame according to an equation indicated in a lower part L8020 of the next figure. In this equation, n denotes bit depth constituting one pixel. For example, if the texture image has a bit depth of 8 bits, n may be a variable value from 0 to 7. In addition, c_bit_depth denotes a maximum bit depth capable of being stored in the container frame, YCbCr denotes YCbCr of the texture image, Y'Cb'Cr' denotes YCbCr of the container frame, and t_bit_depth denotes bit depth of the texture image.

According to another embodiment of the present invention, if a condition of Case 2 is satisfied, resolution of a source depth map is ¼ that of a container format, and chroma subsampling of a container is different from that of a source texture image wherein chroma subsampling of the texture image is 4:2:0 and chroma subsampling of the container is 4:2:2, a bit space of 2*c_bit_depth may be additionally secured as compared with the case in which chroma subsampling of the container is equal to that of the texture image as 4:2:0. A depth value of the source depth map may be mapped to the secured bit space. Further, in the above condition, if chroma subsampling of the texture image is 4:2:0 and aroma subsampling of the container is 4:4:4, a bit space of 6*c_bit_depth may be additionally secured as compared with the case in which chroma subsampling of the container is equal to that of the texture image, i.e., 4:2:0. A depth value of the source depth map may be mapped to the secured bit space. In the above condition, if chroma subsampling of the texture image is 4:2:2 and chroma subsampling of the container is 4:4:4, a bit space of 4*c_bit_depth may be additionally secured as compared with the case in which chroma subsampling of the container is equal to that of the texture image, i.e., 4:2:0. A depth value of the source depth map may be mapped to the secured bit space.

According to another embodiment of the present invention, if a condition of Case 2 is satisfied, resolution of a source depth map is the same as that of a container format, and chroma subsampling of the container is equal to that of a source texture image, i.e., 4:2:0, a depth value of the source depth map may be sequentially mapped to a bit space in the container frame which is secured using a similar method to the above condition (when a condition of Case 2 is satisfied, resolution of the source depth map is ¼ that of the container format, and chroma subsampling of the container is equal to that of the source texture image, i.e., 4:2:0).

According to another embodiment of the present invention, if a condition of Case 2 is satisfied, resolution of a source depth map is equal to that of a container format, and chroma subsampling of a container is different from that of a source texture image, a depth value of the source depth map may be sequentially mapped to a bit space in the container frame which is secured using a similar method to the above condition (when a condition of Case 2 is satisfied, resolution of the source depth map is ¼ that of the container format, and chroma subsampling of the container is equal to that of the source texture image, i.e., 4:2:0).

An upper part L7010 of FIG. 7 illustrates a method of mapping a texture image (4K, 8 bits, 4:2:0) and a depth map (4K, 8 bits) to a container (4K, 10 bits, 4:2:2) in units of bits according to an embodiment (Case 2-2) of the present invention. In L7010, YCbCr of each pixel constituting a source texture image may be mapped to Y'Cb'Cr' of a container frame without change. A depth value of each pixel constituting a source depth map may be mapped to remaining Y'Cb'Cr' of the container frame as described below. In this case, a source format may have a main profile and a container format may have Main 4:2:2 10 profile. As illustrated in the upper part L7010, 0th to 7th bits of Y0 may be mapped to 2nd to 9th bits of Y0', 0th to 7th bits of Y1 may be mapped to 2nd to 9th bits of Y1', 0th to 7th bits of Y2 may be mapped to 2nd to 9th bits of Y2', and 0th to 7th bits of Y3 may be mapped to 2nd to 9th bits of Y3'. 0th to 7th bits of Cb0 may be mapped to 2nd to 9th bits of Cb0' and 0th to 7th bits of Cr0 may be mapped to 2nd to 9th bits of Cr0'. 6th and 7th bits of D0 may be mapped to 0th and 1st bits of Y0', 6th and 7th bits of D1 may be mapped to 0th and 1st bits of Y0', 6th and 7th bits of D2 may be mapped to 0th and 1st bits of Y2', and 6th and 7th bits of D3 may be mapped to 0th and 1st bits of Y3'. 4th and 5th bits of D0 may be mapped to 0th and 1st bits of Cb0', 0th to 3rd bits of D0 may be mapped to 6th to 9th bits of Cb1', and 0th to 5th bits of D1 may be mapped to 0th to 5th bits of Cb1'. 4th and 5th bits of D2 may be mapped to 0th and 1st bits of Cr0', 0th to 3rd bits of D2 may be mapped to 6th to 9th bits of Cr1', and 0th to 5th bits of D3 may be mapped to 0th to 5th bits of Cr1'. That is, among Y'Cb'Cr' of the container, a depth value of the depth map may be mapped to the remaining bit space after mapping YCbCr of the text image. There may be various methods of mapping the depth value of the depth map. According to another embodiment (L7030) of the present invention, YCbCr of a source texture image may be mapped identically to the above-described example. 6th and 7th bits of D0 may be mapped to 0th and 1st bits of Y0', 4th and 5th bits of D0 may be mapped to 0th and 1st bits of Y1', 2nd and 3rd bits of D0 may be mapped to 0th and 1st bits of Y2', and 0th and 1st bits of D0 may be mapped to 0th and 1st bits of Y3'. 6th and 7th bits of D1 may be mapped to 0th and 1st bits of Cb0' and 0th to 5th bits of D1 may be mapped to 4th to 9th bits of Cb1'. 4th to 7th bits of D2 may be mapped to 0th to 3rd bits of Cb1'. 2nd to 3rd bits of D2 may be mapped to 0th and 1st bits of Cr0', 0th and 1st bits of D2 may be mapped to 8th and 9th bits of Cr1', and 0th to 7th bits of D3 may be mapped to 0th to 7th bits of Cr1'. That is, among Y'Cb'Cr' of the container, the depth value of the depth map may be mapped to the remaining bit space after mapping YCbCr of the text image.

A lower part L7020 of FIG. 7 illustrates a method of mapping a texture image (4K, 10 bits, 4:2:0) and a depth map (2K, 12 bits) to a container (4K, 12 bits, 4:2:0) in units of bits according to an embodiment (Case 2-4) of the present invention. In L7020, YCbCr of each pixel constituting a source texture image may be mapped to Y'Cb'Cr' of a container frame without change. A depth value of each pixel constituting a source depth map may be mapped to remaining Y'Cb'Cr' of the container frame as described below. In this case, a source format may have Main 10 profile and a container format may have Main 12 profile. As illustrated in the lower part L7020, 0th to 9th bits of Y0 may be mapped to 2nd to 11th bits of Y0', 0th to 9th bits of Y1 may be mapped to 2nd to 11th bits of Y1', 0th to 9th bits of Y2 may be mapped to 2nd to 11th bits of Y2', and 0th to 9th bits of Y3 may be mapped to 2nd to 11th bits of Y3'. 0th to 9th bits of Cb0 may be mapped to 2nd to 11th bits of Cb0' and 0th to 9th bits of Cr0 may be mapped to 2nd to 11th bits of Cr0'. 10th and 11th bits of D may be mapped to 0th and 1st bits of Y0', 8th and 9th bits of D may be mapped to 0th and 1st bits of Y1', 6th and 7th bits of D may be mapped to 0th and 1st bits of Y2', and 4th and 5th bits of D may be mapped to 0th and 1st bits of Y3'. 2nd and 3rd bits of D may be mapped to 0th and 1st bits of Cb0' and 0th and 1st bits of D may be mapped to 0th and 1st bits of Cr0'. That is, among Y'Cb'Cr' of the container, a depth value of a depth map may be mapped to the remaining bit space after mapping YCbCr of the texture image.

FIG. 8 is a view illustrating equations used to map a texture image and a depth map to a container frame in units of bits according to an embodiment (Case 2) of the present invention.

An equation indicated in an upper part L8010 of the figure is used to map YCbCr of each pixel constituting a source texture image to Y'Cb'Cr' of each pixel constituting a container frame according to an embodiment (Case 2) of the present invention. In this equation, n denotes bit depth constituting one pixel. For example, if the texture image has a bit depth of 8 bits, n may be a variable value from 0 to 7. In addition, t_bit_depth denotes bit depth of the texture image, YCbCr denotes YCbCr of the texture image, and Y'Cb'Cr' denotes YCbCr of the container frame.

An equation indicated in a lower part L8020 of the figure is used to map a depth value of each pixel constituting a source depth map to Y'Cb'Cr' of each pixel constituting a container frame according to an embodiment (Case 2) of the present invention. In this equation, n denotes bit depth constituting one pixel. For example, if the texture image has a bit depth of 8 bits, n may be a variable value from 0 to 7. In addition, c_bit_depth denotes a maximum bit depth capable of being stored in the container frame, YCbCr denotes YCbCr of the texture image, Y'Cb'Cr' denotes YCbCr of the container frame, and t_bit_depth denotes the bit depth of the texture image.

Figure 9:
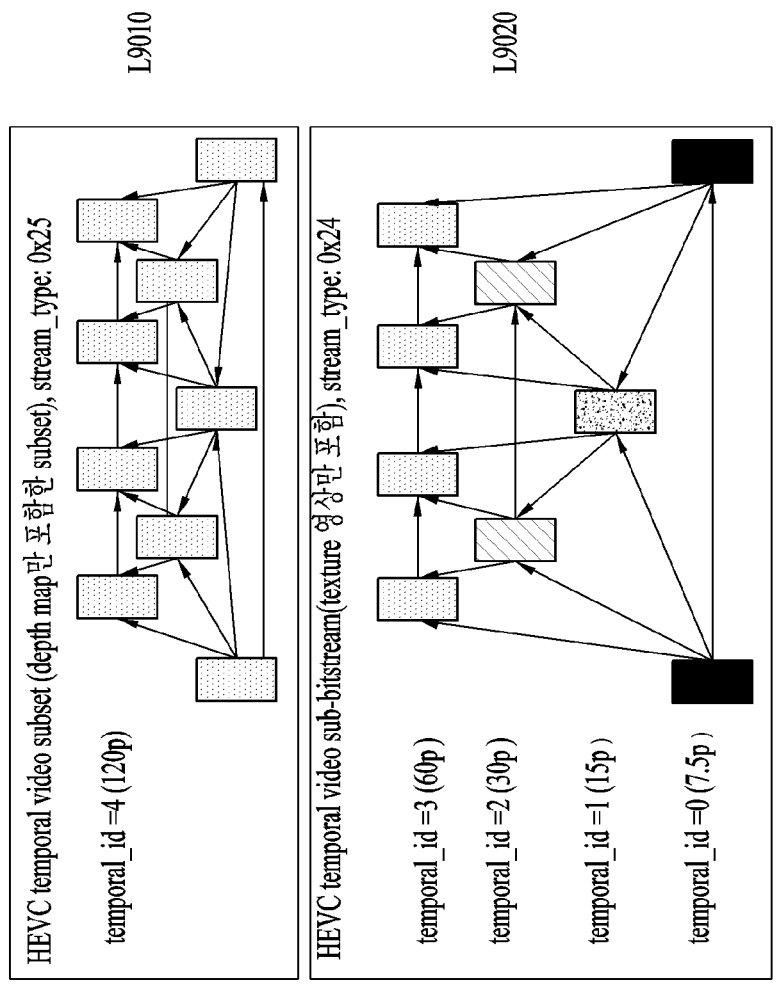
FIG. 9 is a view illustrating a method of configuring a texture image and a depth map by different HEVC temporal layers according to an embodiment (Case 3) of the present invention.

FIG. 9 is a view illustrating a method of configuring a texture image and a depth map by different HEVC temporal layers according to an embodiment (Case 3) of the present invention.

According to an embodiment of the present invention, the texture image may be configured by an HEVC temporal video sub-bitstream and the depth map may be configured by an HEVC temporal video subset. The configured texture image and depth map may be transmitted to a receiver. That is, the texture image and the depth map may be transmitted in respective HEVC temporal layers. In this case, a container format and a source texture image may have the same profile and different levels. According to an embodiment of the present invention, although a frame rate of 120 p is used, the frame rate takes a form of including a texture image format of 60 p and a depth map format of 60 p in actuality.

According to an embodiment of the present invention, as illustrated in a lower part L9020 of FIG. 9, HEVC encoding may be performed by including a 4K left image and a 4K right image in one 4K container frame, using an HEVC temporal video sub-bitstream identified as stream type=0×24. Herein, the HEVC temporal video sub-bitstream may include only a texture image.

According to an embodiment of the present invention, as illustrated in an upper part L9010 of FIG. 9, HEVC encoding may be performed by including a 4K depth map for a left image and a 4K depth map for a right image in one 4K container frame, using an HEVC temporal video subset identified as stream type=0×25. Herein, the HEVC temporal video subset may include only a depth map.

According to another embodiment of the present invention, instead of transmitting the texture image through the HEVC temporal video sub-bitstream and transmitting the depth map through the HEVC temporal video subset, layers may be configured such that a layer identified as temporal_id=0 includes a left image, a layer identified as temporal_id=1 includes a depth map for the left image, a layer identified as temporal_id=2 includes a right image, and a layer identified as temporal_id=3 includes a depth map for the right image. That is, the layers may be configured by pairing a lower layer and an upper layer. According to an embodiment of the present invention, a reference set may be adjusted according to a type of an image (a texture image or a depth map) included in a layer which is referred to at the video level in order to prevent deterioration in coding efficiency.

Figure 10:
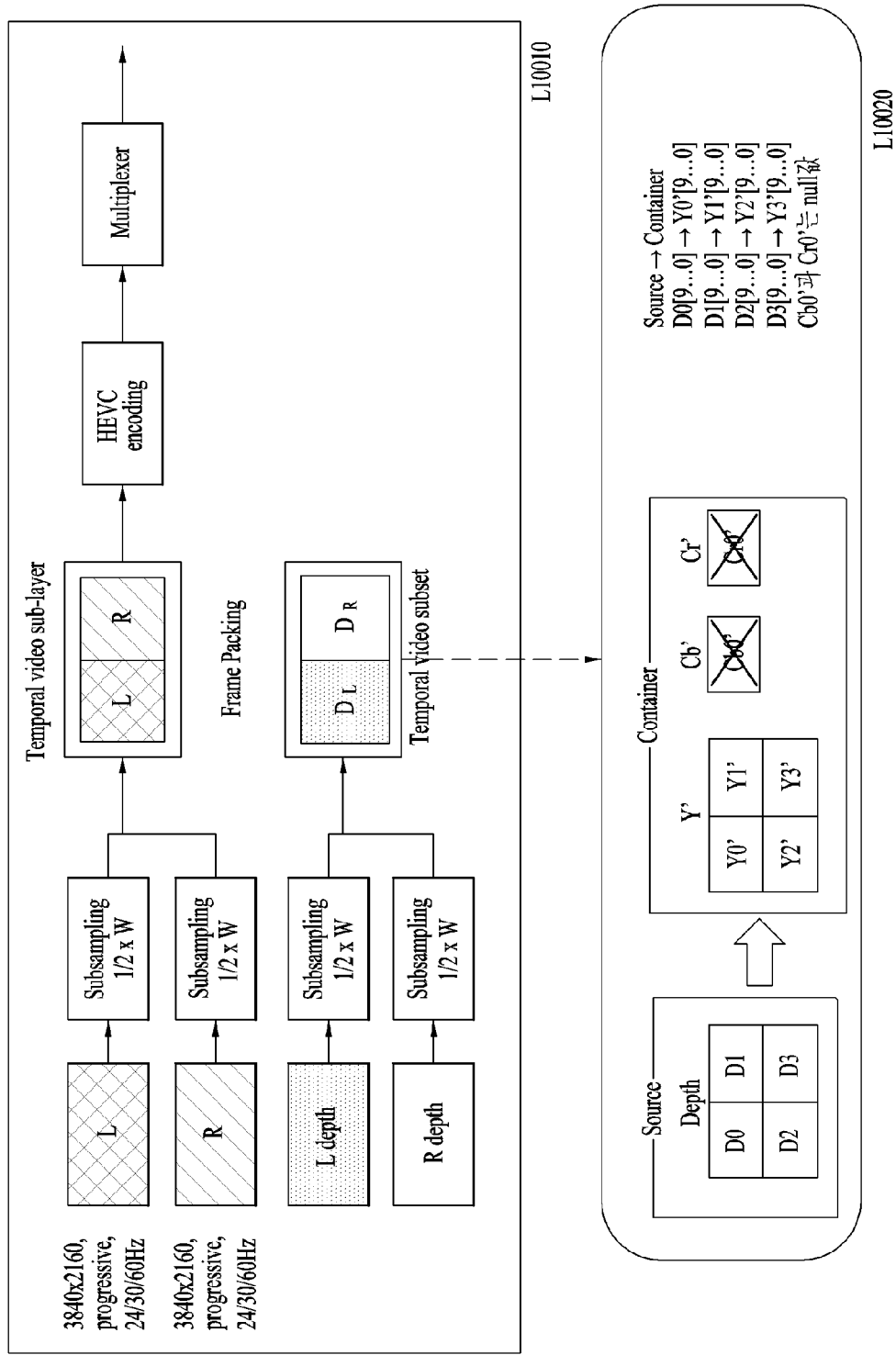
FIG. 10 is a view illustrating a method of packing a 4K left image and a 4K right image into one 4K container frame, packing a 4K depth map for the left image and a 4K depth map for the right image into another 4K container frame, and including the packed container frames in different temporal layers according to an embodiment (Case 3-1) of the present invention.

FIG. 10 is a view illustrating a method of packing a 4K left image and a 4K right image into one 4K container frame, packing a 4K depth map for the left image and a 4K depth map for the right image into another 4K container frame, and including the packed container frames in different temporal layers according to an embodiment (Case 3-1) of the present invention.

An upper part L10010 of FIG. 10 illustrates an embodiment in which a 4K left image and a 4K right image are packed into one 4K container frame in a side-by-side form and the packed container frame is included in an HEVC temporal video sub-bitstream identified as stream_type=0×24. In addition, the upper part L10010 illustrates an embodiment in which a 4K depth map for the left image and a 4K depth map for the right image are packed into one 4K container frame in a side-by-side form and the packed container frame is included in an HEVC temporal video subset identified as stream_type=0×25. In this case, the texture images and/or the depth maps may be packed in a top-and-bottom, time interleaving, and/or rectangular region arrangement form. The HEVC temporal video sub-bitstream may have the same meaning as an HEVC temporal video sub-layer.

Referring to the upper part L10010, the texture images may have a resolution of 3840×2160, progressive scanning, and a frame rate of 24/30/60 Hz. Herein, 3840×2160 may represent monitor resolution and has the same meaning as a resolution of 4K.

Referring to the upper part L10010, according to an embodiment of the present invention, the left image having a resolution of 4K, the right image having resolution of 4K, the depth map for the left image, and the depth map for the right image may be downsampled to ½ width. The downsampled texture images and depth maps still have a resolution of 4K and each of the texture images and depth maps may be packed into a 4K container frame in a side-by-side form. The packed 4K container frame may be HEVC-encoded, multiplexed, and transmitted to a receiver.

A lower part L10020 of FIG. 10 illustrates a method of mapping a depth value of each pixel constituting a source 4K depth map to Y'Cb'Cr' of a pixel constituting a 4K container frame. According to an embodiment of the present invention, YCbCr of each pixel constituting a texture image may be sequentially mapped to Y'Cb'Cr' of each pixel constituting a container frame without change. A mapping equation related to this process has been described previously. According to an embodiment of the present invention, a depth value of each pixel constituting the source depth map may be mapped to Y' of each pixel constituting the container frame without change. In this case, the texture image and the container frame may have a format of 4K, 10 bits, and 4:2:0 and the depth map may have a format of 4K and 10 bits. Accordingly, as illustrated in the lower part L10020, 0th to 9th bits of D0 may be mapped to 0th to 9th bits of Y0', 0th to 9th bits of D1 may be mapped to 0th to 9th bits of Y1', 0th to 9th bits of D2 may be mapped to 0th to 9th bits of Y2', and 0th to 0th bits of D3 may be mapped to 0th to 9th bits of Y3'. In this case, Cb' and Cr' of the container frame may have null values.

Figure 11:
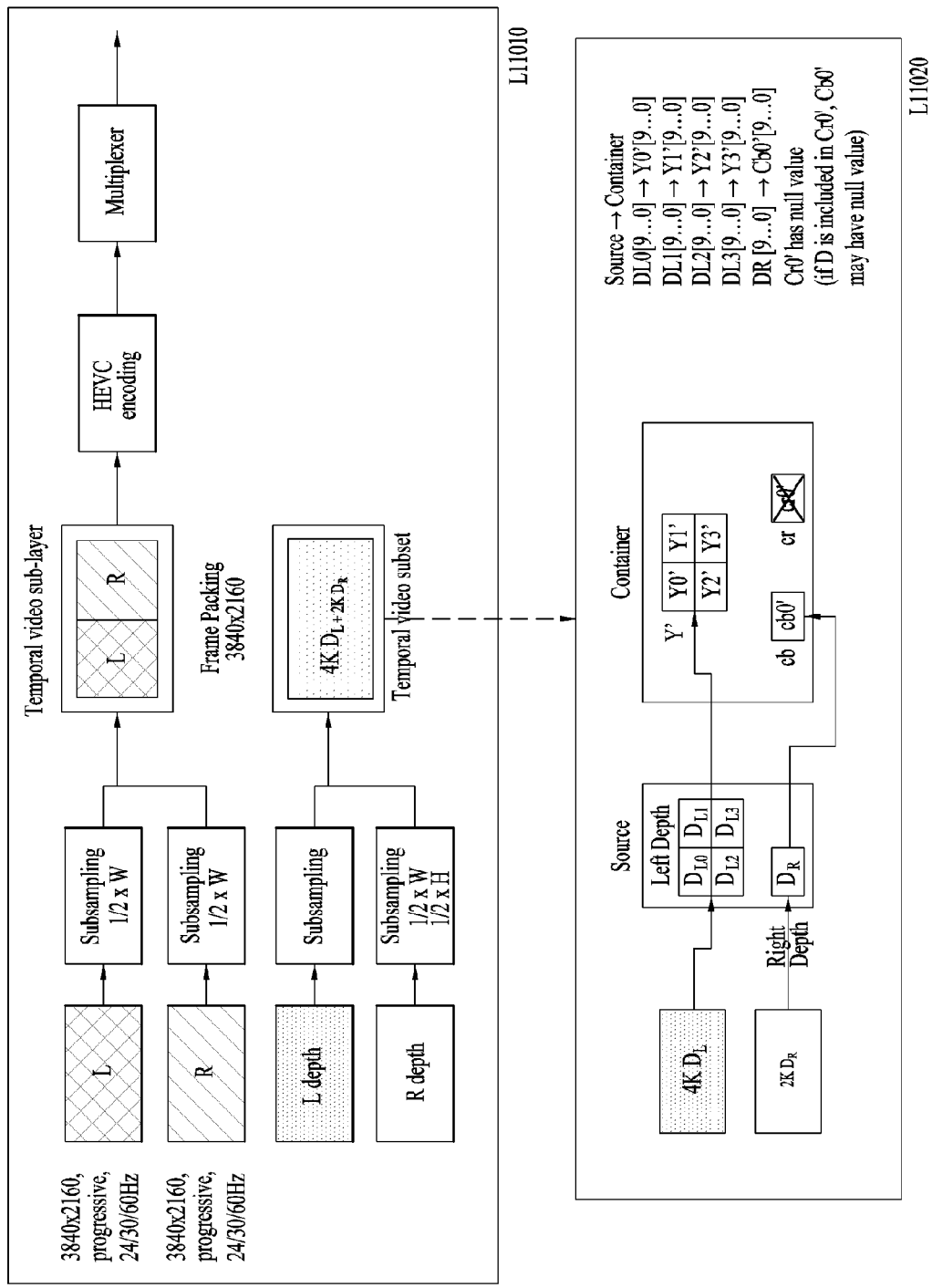
FIG. 11 is a view illustrating a method of packing a 4K left image and a 4K right image into one 4K container frame, packing a 4K depth map for the left image and a 2K depth map for the right image into another 4K container frame, and including the packed container frames in different temporal layers according to an embodiment (Case 3-2) of the present invention.

FIG. 11 is a view illustrating a method of packing a 4K left image and a 4K right image into one 4K container frame, packing a 4K depth map for the left image and a 2K depth map for the right image into another 4K container frame, and including the packed container frames in different temporal layers according to an embodiment (Case 3-2) of the present invention.

An upper part L11010 of FIG. 11 illustrates an embodiment in which a 4K left image and a 4K right image are packed into one 4K container frame in a side-by-side form and the packed container frame is included in an HEVC temporal video sub-bitstream identified as stream_type=0×24. In addition, the upper part L11010 illustrates an embodiment in which a 4K depth map for the left image and a 4K depth map for the right image are packed into one 4K container frame in a side-by-side form and the packed container frame is included in an HEVC temporal video subset identified as stream_type=0×25. In this case, the texture images and/or the depth maps may be packed in a top-and-bottom, time interleaving, and/or rectangular region arrangement form. The HEVC temporal video sub-bitstream may have the same meaning as an HEVC temporal video sub-layer.

Referring to the upper part L11010, the texture image may have a resolution of 3840×2160, progressive scanning, and a frame rate of 24/30/60 Hz. Herein, 3840×2160 may represent monitor resolution and has the same meaning as a resolution of 4K.

Referring to the upper part L11010, according to an embodiment of the present invention, the left image having a resolution of 4K, the right image having resolution of 4K, and the depth map for the left image may be downsampled to ½ width. Alternatively, the depth map for the left image may not be downsampled. Meanwhile, the depth map for the right image may be downsampled to ½ width and ½ height. The downsampled texture images and depth map for the left image still have a resolution of 4K and the downsampled depth map for the right image may have a resolution of 2K. As in the upper part L11010, each of the texture images and depth maps may be packed into a 4K container frame. The packed 4K container frame may be HEVC-encoded, multiplexed, and transmitted to a receiver.

A lower part L11020 of FIG. 11 illustrates a method of mapping a depth value of each pixel constituting a source 4K depth map to Y'Cb'Cr' of a pixel constituting a 4K container frame. According to an embodiment of the present invention, YCbCr of each pixel constituting a texture image may be sequentially mapped to Y'Cb'Cr' of each pixel constituting a container frame without change. A mapping equation related to this process has been described previously. According to an embodiment of the present invention, a depth value of each pixel constituting a 4K depth map for a left image may be mapped to Y' of each pixel constituting a container frame and a depth map of each pixel constituting a 2K depth map for a right image may be mapped to Cb' or Cr' of each pixel constituting the container frame. In this case, the texture image and the container frame may have a format of 4K, 10 bits, and 4:2:0, the depth map for the left image may have a format of 4K and 10 bits, and the depth map for the right image may have a format of 2K and 10 bits. In the figure, DL denotes the depth map for the left image and DR denotes the depth map for the right image. Accordingly, as illustrated in the lower part L11020, 0th to 9th bits of DL0 may be mapped to 0th to 9th bits of Y0', 0th to 9th bits of DL1 may be mapped to 0th to 9th bits of Y1', 0th to 9th bits of DL2 may be mapped to 0th to 9th bits of Y2', and 0th to 0th bits of DL3 may be mapped to 0th to 9th bits of Y3'. In addition, 0th to 9th bits of DR may be mapped to 0th to 9th bits of Cb0' or Cr0'. In this case, if the depth map for the right image is mapped to Cr0', Cb0' may have a null value and, if the depth map for the right image is mapped to Cb0', Cr0' may have a null value.

FIG. 12 is a view illustrating configuration of frame_packing_arrangement_for_auto_stereoscopic SEI message and a frame_packing_arrangement_type_for_auto_stereoscopic field value according to an embodiment of the present invention.

According to an embodiment of the present invention, a method of signaling the contents of the above-described embodiment of Case 1 and/or Case 2 at the video level may be provided.

According to an embodiment of the present invention, a new frame packing arrangement SEI message is defined in a video elementary stream (e.g., HEVC) and a frame format into which a left image, a right image, a depth map for the left image, and a depth map for the right image are packed may be signaled through the frame packing arrangement SEI message according to an embodiment of the present invention. More specifically, according to an embodiment of the present invention, a frame format into which a left image, a right image, a depth map for the left image, and a depth map for the right image are packed according to an embodiment of the present invention may be signaled using a frame_packing_arrangement_type field included in the new frame packing arrangement SEI message. An embodiment of the present invention may newly define an arrangement type for a depth map in addition to an existing defined frame packing arrangement type so that a frame format into which a left image, a right image, a depth map for the left image, and a depth map for the right image are packed according to an embodiment of the present invention may be signaled. The new frame packing arrangement SEI message may be referred to as the frame_packing_arrangement_for_auto_stereoscopic SEI message. The frame_packing_arrangement_type field included in the new frame packing arrangement SEI message may be referred to as a frame_packing_arrangement_type_for_auto_stereoscopic field. According to an embodiment of the present invention, resolution, bit depth, and/or chroma subsampling of a texture image, a depth map, and/or a container format may be signaled using frame_packing_composition_info( ) field included in the new frame packing arrangement SEI message. That is, information about a source image of a texture image and a depth map and about a container format, prior to packing, may be signaled. According to another embodiment of the present invention, resolution, bit depth, and/or chroma subsampling of the texture image and the depth map may be signaled using profile, level, and/or tier information about the texture image and the depth map. An embodiment of the present invention may signal a composition type of each pixel constituting a container frame using a pixel_composition_info( ) field included in a frame_packing_composition_info( ) field. The frame_packing_composition_info( ) field may be included in the position of a frame_packing_arrangement_reserved_byte field included in the existing frame packing arrangement SEI message. Further, an embodiment of the present invention may signal whether horizontal flipping of a left image and/or a right image is performed using a spatial_flipping_flag field and a frame0_flipped_flag field.

According to another embodiment of the present invention, a frame format into which a left image, a right image, a depth map for the left image, and a depth map for the right image are packed according to an embodiment of the present invention may be signaled using the existing frame packing arrangement SEI message included in a video elementary stream (e.g., HEVC). More specifically, according to an embodiment, information about a source image of a texture image and a depth image and about a container format, prior to packing, may be signaled using a frame_packing_arrangement_reserved_byte field included in the existing frame packing arrangement SEI message. That is, resolution, bit depth, and/or chroma subsampling of the texture image, the depth map, and/or the container format may be signaled. In this case, the frame_packing_arrangement_reserved_byte field may indicate the frame_packing_composition_info( ) field in this figure. More specifically, according to an embodiment of the present invention, a frame format into which a left image, a right image, a depth map for the left image, and a depth map for the right image are packed according to an embodiment of the present invention may be signaled using the frame_packing_arrangement_type field included in the existing frame packing arrangement SEI message. According to an embodiment of the present invention, an arrangement type for a depth map may be newly defined in addition to the existing defined frame packing arrangement type so that a frame format into which a left image, a right image, a depth map for the left image, and a depth map for the right image are packed according to an embodiment of the present invention may be signaled. In addition, according to an embodiment of the present invention, whether horizontal flipping of the left image and/or the right image is performed may be signaled using the spatial_flipping_flag field and the frame0_flipped_flag field.

A frame_packing_arrangement_for_auto_stereoscopic SEI message L12010 according to an embodiment of the present invention may include a frame_packing_arrangement_id field, a frame_packing_arrangement_cancel_flag field, a frame_packing_arrangement_type_for_auto_stereoscopic field, a quincunx_sampling_flag field, a content_interpretation_type field, a spatial_flipping_flag field, a frame0_flipped_flag field, a field_views_flag field, a current_frame_is_frame0_flag field, a frame0_self_contained_flag field, a frame1_self_contained_flag field, a frame0_grid_position_x field, a frame0_grid_position_y field, a frame1_grid_position_x field, a frame1_grid_position_y field, a frame_packing_composition_info( ) field, a frame_packing_arrangement_persistence_flag field, and/or an upsampled_aspect_ratio_flag field. Herein, the fields included in the new frame_packing_arrangement_for_auto_stereoscopic SEI message may modify the name and/or meaning thereof so that they can distinguish from fields included in the existing frame_packing_arrangement SEI message.

The frame_packing_arrangement_id field may contain an identification number that may be used to identify the usage of the frame packing arrangement SEI message.

The frame_packing_arrangement_cancel_flag equal to 1 may indicate that the frame packing arrangement SEI message cancels the persistence of any previous frame packing arrangement SEI message in output order. The frame_packing_arrangement_cancel_flag field equal to 0 may indicate that frame packing arrangement information follows.

The frame_packing_arrangement_type_for_auto_stereoscopic field may indicate the type of packing arrangement of the frames.

The quincunx_sampling_flag field equal to 1 may indicate that each color component plane of each constituent frame is quincunx-sampled. The quincunx_sampling_flag equal to 0 may indicate that the color component planes of each constituent frame are not quincunx-sampled.

The content_interpretation_type field may indicate the intended interpretation of constituent frames.

The spatial_flipping_flag field equal to 1 may indicate that one of two constituent frames is spatially flipped relative to its intended orientation for display or other such purposes.

The frame0_flipped_flag field, when spatial_flipping_flag is equal to 1, may indicate which one of the two constituent frames is flipped.

The field_views_flag field equal to 1 may indicate that all pictures in the current coded video sequence are coded as complementary field pairs.

The current_frame_is_frame0_flag frame equal to 1 may indicate that a decoded frame is constituent frame 0 and the next decoded frame in output order is constituent frame 1, and the display time of constituent frame 0 may be delayed to coincide with the display time of constituent frame 1. The current_frame_is_framed0_flag equal to 0 may indicate that the current decoded frame is constituent frame 1 and the previous decoded frame in output order may be constituent frame 0, and the display time of constituent frame 1 may not be delayed for purposes of stereo-view pairing.

The frame0_self_contained_flag frame equal to 1 may indicate that no inter-prediction operations within a decoding process for samples of constituent frame 0 of a coded video sequence refer to samples of any constituent frame 1. The frame0_self_contained_flag equal to 0 may indicate that some inter-prediction operations within the decoding process for the samples of constituent frame 0 of the coded video sequence may or may not refer to samples of some constituent frame 1.

The frame1_self_contained_flag frame equal to 1 may indicate that no inter prediction operations within the decoding process for the samples of constituent frame 1 of the coded video sequence refer to samples of any constituent frame 0. The frame1_self_contained_flag frame equal to 0 may indicate that some inter prediction operations within the decoding process for the samples of constituent frame 1 of the coded video sequence may or may not refer to samples of some constituent frame 0.

The frame0_grid_position_x field (when present) may specify the x component of the (x, y) coordinate pair for constituent frame 0.

The frame0_grid_position_y (when present) may specify the y component of the (x, y) coordinate pair for constituent frame 0.

The frame1_grid_position_x (when present) may specify the x component of the (x, y) coordinate pair for constituent frame 1.

The frame1_grid_position_y (when present) may specify the y component of the (x, y) coordinate pair for constituent frame 1.

A detailed description of the frame_packing_composition_info( ) field will be given later.

The frame_packing_arrangement_persistence_flag field may specify the persistence of the frame packing arrangement SEI message and may specify a frame order count interval within which another frame packing arrangement SEI message with the same value of frame_packing_arrangement_id or the end of the coded video sequence may be present in a bitstream.

The upsampled_aspect_ratio_flagequal field equal to 1 may indicate that a sample aspect ratio (SAR) indicated by VUI parameters of an SPS identifies the SAR of samples after the application of an upconversion process to produce a higher resolution frame from each constituent frame. The upsampled_aspect_ratio_flag field equal to 0 may indicate that the SAR indicated by the VUI parameters of the SPS identifies the SAR of the samples before the application of any such upconversion process.

A right part L12020 illustrates a field value indicated by the frame_packing_arrangement_type_for_auto_stereoscopic field. According to an embodiment of the present invention, the field value of 1 may indicate frame arrangement in which a texture image in side-by-side form and a depth map in side-by-side form are packed into each region of a frame divided into 4 regions. This field equal to 1 is a result of extending the meaning of frame_packing_arrangement_type 3 indicating a frame arrangement in a side-by-side form. According to an embodiment of the present invention, the field equal to 2 may indicate frame arrangement in which a texture image in a top-and-bottom form and a depth map in a top-and-bottom form are packed into each region of a frame divided into 4 regions. Further, the field value of 2 is obtained as a result of extending the meaning of frame_packing_arrangement_type 4 indicating frame arrangement in the top-and-bottom form. According to an embodiment of the present invention, the field equal to 3 may indicate frame arrangement in which a left image in a side-by-side or top-and-bottom form and a depth map for the left map are packed into each region of an odd frame divided into 2 regions and a right image in a side-by-side or top-and-bottom form and a depth map for the right map are packed into each region of an even frame divided into 2 regions. Further, the field value of 3 is obtained as a result of extending the meaning of frame_packing_arrangement_type 5 indicating frame arrangement in a time interleaving form. According to another embodiment of the present invention, a frame may be configured in which a left image and a right image in a side-by-side or top-and-bottom form are packed into each region of an odd frame divided into 2 regions and a depth map for the left image and a depth map for the right image in a side-by-side or top-and-bottom form are packed into each region of an even frame divided into 2 regions. According to an embodiment of the present invention, the field equal to 4 indicates frame arrangement in which a depth map is additionally packed into rectangular region arrangement in which a left image of 720p is arranged in a 1920×1080 frame without a scaling process and a right image is segment-arranged in the remaining position after arranging the left image. The field value of 4 is obtained by extending frame packing arrangement included in an existing segmented rectangular frame packing arrangement SEI message. According to another embodiment of the present invention, a frame may be configured in which a left image of 720p is arranged in an odd-numbered 1920×1080 frame, a depth map for the left image is segment-arranged in the remaining position after arranging the left image, a right image of 720p is arranged in an even-numbered 1920×1080 frame, and a depth map for the right image is segment-arranged in the remaining position after arranging the right image. According to another embodiment of the present invention, a frame may be configured in which a left image of 720p is arranged in an odd-numbered 1920×1080 frame, a right image is segment-arranged in the remaining position after arranging the left image, a depth map for the left image is arranged in an even-numbered 1920×1080 frame, and a depth map for the right image is segment-arranged in the remaining position after arranging the depth map for the left image.

According to an embodiment of the present invention, a method of signaling the contents of the embodiments of Cases 1, 2 and 3 at the system level may be provided.

According to an embodiment of the present invention, stream_type of a stream that transmits a texture image in a program map table (PMT) may be signaled as 0×24 which is used for HEVC. When a depth map is transmitted using an HEVC temporal video subset, stream_type of the HEVC temporal video subset may be signaled as 0×25. According to an embodiment of the present invention, FPA_SEI_not_present_flag included in an HEVC descriptor of the PMT may be set to 0. Thus, a receiver according to an embodiment of the present invention may be aware of the contents of Case 1, Case 2, and/or Case 3 through signaling of the above-described video level when FPA_SEI_not_present_flag='0'.

According to another embodiment of the present invention, the contents of Case 1, Case 2, and/or Case 3 may be signaled through signaling of a component level in PSIP and/or SI. In this case, a component may mean an elementary stream.

FIG. 13 is a view illustrating configuration of frame_packing_composition_info( ) according to an embodiment of the present invention.

frame_packing_composition_info( ) according to an embodiment of the present invention may include information about a texture image and/or a depth map. More specifically, frame_packing_composition_info( ) may include resolution, frame rate, and chroma sampling of the texture image and/or resolution, frame rate, and chroma sampling of the depth map. In addition, frame_packing_composition_info( ) according to an embodiment of the present invention may signal information as to how a source texture image and depth map format are mapped to a container format. According to an embodiment of the present invention, information about the container format may be signaled through information about a profile, a level, and/or a tier of HEVC_descriptor( ) in the PMT.

frame_packing_composition_info( ) according to an embodiment of the present invention may include a texture_resolution field, a texture_frame_rate field, a texture_chroma_sub_sampling field, a texture_bit_depth field, a depth_map_resolution field, a depth_frame_rate field, a depth_map_bit_depth field, and/or a pixel_composition_info( ) field.

The texture_resolution field, the texture_frame_rate field, the texture_chroma_sub_sampling field, and the texture_bit_depth field may indicate information about resolution, frame rate, chroma subsampling, and bit depth of the texture image.

The depth_map_resolution field, the depth_frame_rate field, and the depth_map_bit_depth field may indicate information about resolution, frame rate, and bit depth of the depth map.

The pixel_composition_info( ) field container frame may indicate information as to how YCbCr of each pixel constituting a container frame is configured. For example, in Case 1 or Case 2 according to an embodiment of the present invention, YCbCr of a source texture image and/or a depth value of a depth map are mapped to YCbCr of each pixel constituting the container frame according to the above-described equation and information about such a mapping method (configuration method) may be included in this field. In this case, all pixels constituting a frame may be configured as defined in this field.

FIG. 14 is a view illustrating configuration of 3D_operating_point( ) according to an embodiment of the present invention.

According to an embodiment of the present invention, a method of signaling the contents of the above-described embodiment of Case 3 at the video level may be provided.

According to an embodiment of the present invention, a new operating point SEI message is defined in a video elementary stream (e.g., HEVC) and the contents indicating that a depth map is transmitted using a layer different from that of a texture image may be signaled through the operating point SEI message. The operating point SEI message may be referred to as a 3D operating point SEI message.

According to an embodiment of the present invention, the 3D_operating_point SEI message may include a service_type field, a service_frame_rate field, a max_temporal_id field, a temporal_id field, a layer_type field, a t_layer_dependency field, a d_layer_dependency field, a num_of_operating_points field, a layer_combination_type, and/or a layer_composition_info( ) field.

The service_type field may indicate the type of a corresponding service. The field value of 00 may indicate that the corresponding service is a temporal scalability service. The temporal scalability service may represent a service including only a texture image in multiple temporal layers. The field value of 10 may indicate that the corresponding service is an auto-stereoscopic service. The auto-stereoscopic service may represent a service including a texture image and a depth map in each of multiple temporal layers.

The service_frame_rate field may indicate a frame rate that a current service finally provides. For example, if the field value is 000, this may indicate that a frame rate provided by the current service is 60 p and, if the field value is 001 this may indicate that a frame rate provided by the current service is 120 p.

The max_temporal_id field may indicate a maximum number of layers included in a current service. In other words, this field may indicate a maximum value of a temporal ID. If the max_temporal_id field includes a temporal video subset according to an embodiment of the present invention, this field may indicate up to a maximum temporal ID of the temporal video subset.

The temporal_id field may indicate an ID of each layer. This field value may indicate a value obtained by subtracting 1 from a nuh_temporal_id_plus1 field value.

The layer_type field may indicate the type of an image included in each layer. According to an embodiment of the present invention, if the field value of 0 may indicate a texture image and the field value of 1 may indicate a depth map.

The t_layer_dependency field may indicate a layer that can be a reference for prediction between layers including a texture image. That is, dependency between layers may be signaled. According to an embodiment of the present invention, dependency values may be arranged in ascending order so that, if types of a layer having a temporal ID of 0 and a layer having a temporal ID of 1 are texture images, dependency values of the two layers are expressed as 0000 and 0001 and signaling indicating that the layer having a temporal ID of 0 is a reference of the layer having a temporal ID of 1 may be performed.

The d_layer_dependency field may indicate a layer that can be a reference for prediction between layers including a depth map. That is, dependency between layers may be signaled through this field. A detailed signaling method may be replaced with the above description of t_layer_dependency field.

The num_of_operating_points field may indicate the number of operating points indicating the number of layer combinations.

The layer_combination_type field may indicate through which layer combination a service corresponding to a corresponding service type can be provided. According to an embodiment of the present invention, a layer combination type may be signaled with respect to each operating point and a detailed description thereof will be given later.

The layer_composition_info( ) field may include the same information as the above-described frame_packing_composition_info( ) field and signal format information about a texture image and/or a depth map included in a corresponding layer. In addition, this field may include information about a layer. According to an embodiment of the present invention, the layer_composition_info( ) field may include a flag field (related to depth) in preparation for the case in which a format of a depth map for a left image is different from that of a depth map for a right image as in the embodiment of Case 3-2. The flag field (related to depth) may have a value of 1 when the format of the depth map for the left image is different from that of the depth map for the right image and may have a value of 0 when they are equal. If the flag field (related to depth) is 1, the layer_composition_info( ) field may include both format information of the depth map for the left image and format information of the depth map for the right image. Similarly, the layer_composition_info( ) field may include a flag field (related to texture) for distinguishing between formats when a format of the left image is different from that of the right image. This flag field (related to texture) may have a value of 1 when the format of the left image is different from that of the right image and may have a value of 0 when they are equal. If this flag field (related to texture) is 1, the layer_composition_info( ) field may include both format information of the left image and the format information of the right image. That is, if the flag field indicating that the left image has a different format from the right image is 1, the layer_composition_info( ) field may include an L_texture_resolution field, an L_frame_rate field, an L_texture_bit_depth field, an L_texture_chroma_subsampling field, an R_texture_resolution field, an R_frame_rate field, an R_texture_bit_depth field, and/or an R_texture_chroma_subsampling field. In addition, the layer_composition_info( ) field may indicate information about resolution, frame rate, bit depth, and chroma subsampling of the left image and the right image. If the flag field indicating that the depth map for the left image has a different format from the depth map for the right image is 1, the layer_composition_info( ) field may include an L_depth_map_resolution field, an L_depth_map_frame_rate field, an L_depth_map_bit_depth field, an R_resolution field, an R_depth_map_frame_rate field, and/or an R_depth_map_bit_depth field. In addition, the layer_composition_info( ) field may indicate information about resolution, frame rate, bit depth, and chroma subsampling of the depth map for the left image and the depth map for the right image. The fields indicating format information of the texture image the depth map, included in the layer_composition_info( ) field according to an embodiment of the present invention, may be signaled through profile, level, and tier information of the texture image and the depth map. The layer_composition_info( ) field according to an embodiment of the present invention includes a pixel_composition_info( ) field and the pixel_composition_info( ) field is the same as the pixel_composition_info( ) field included in the above-described frame_packing_composition_info( ).

FIG. 15 is a view illustrating layer_combination_type according to an embodiment of the present invention.

According to an embodiment of the present invention, if a total of 8 layers is present, layer_combination_type may indicate a layer combination provided in a current service. That is, after bits are allocated to a layer having a temporal ID of 0 to a layer having a temporal ID of 7, a layer_combination_type field value of 1 may indicate that a corresponding layer is included in a corresponding service and the field value of 0 may indicate that a corresponding layer is not included in a corresponding service.

For example, referring to FIG. 15, if service_type is 00 (temporal scalability service) and if layer_combination_type is 11110000 as illustrated, an embodiment of the present invention may provide a temporal scalability service by decoding a layer having a temporal ID of 0, a layer having a temporal ID of 1, a layer having a temporal ID of 2, and a layer having a temporal ID of 3.

Figure 16:
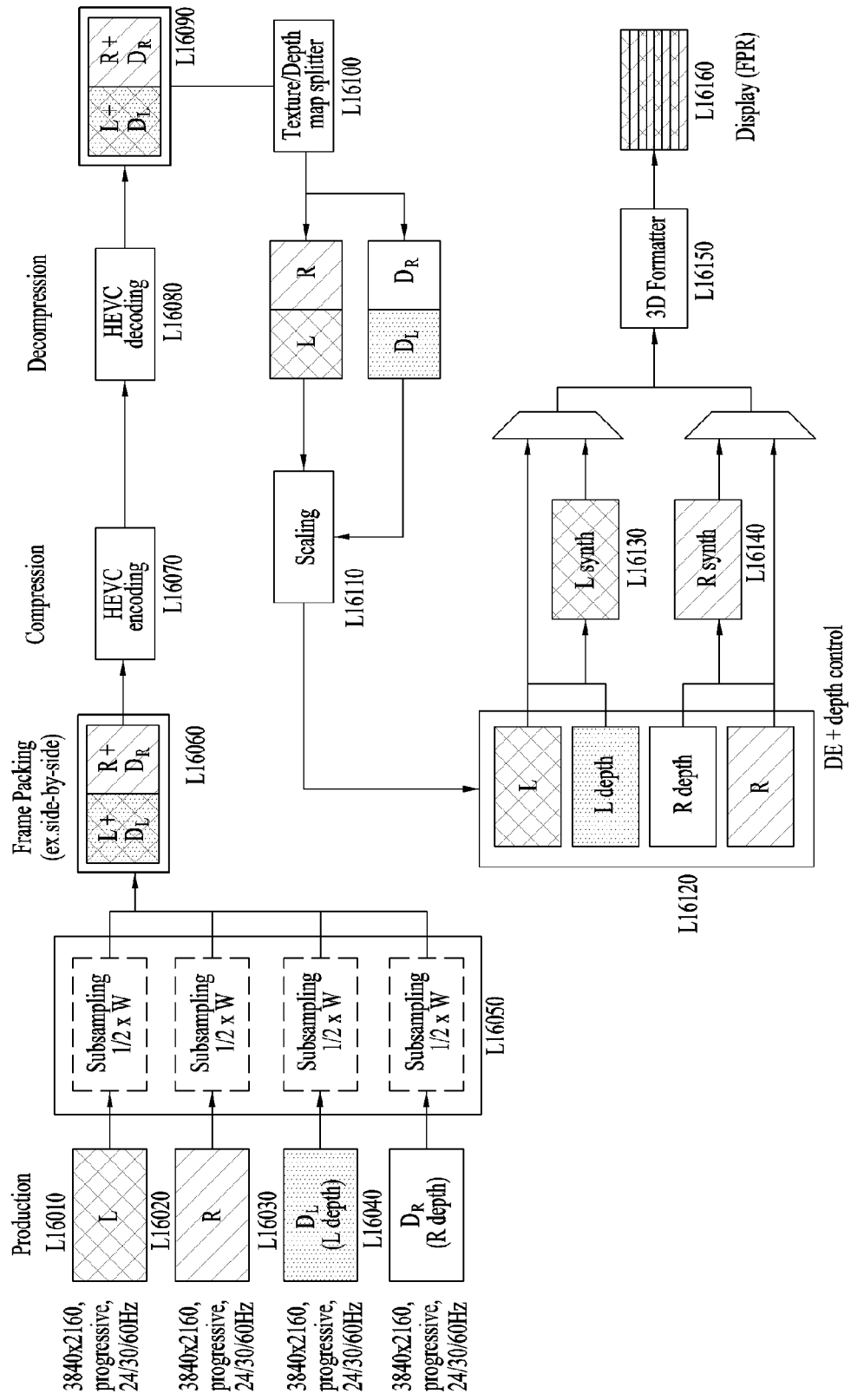
FIG. 16 is a view illustrating a procedure of packing a left image, a right image, a depth map for the left image, and a depth map for the right map into one container frame and transmitting the packed container frame according to an embodiment (Case 1 and/or Case 2) of the present invention.

FIG. 16 is a view illustrating a procedure of packing a left image, a right image, a depth map for the left image, and a depth map for the right map into one container frame and transmitting the packed container frame according an embodiment (Case 1 and/or Case 2) of the present invention.

According to an embodiment of the present invention, a 4K-level left image (L16010), a 4K-level right image (L16020), a 4K-level depth map (L16030) for the left image, and/or a 4K-level depth map (L16040) for the right image, produced during a production step, may be subsampled (L16050) to a frame having ½ width. The left image and/or the right image of the production step may corresponding to a video image having a resolution of 3840×2160, progressive scanning, and a frame rate of 24/30/60 Hz. The subsampled left image, right image, depth map for the left image, and/or depth map for the right image may be packed into one container frame (L16060). According to another embodiment of the present invention, if the left image, right image, depth map for the left image, and/or depth map for the right image of the production step are produced to an HD level, they may be packed into one 4K-level frame without the above-described subsampling process. The subsampling according to an embodiment of the present invention may have the same meaning as downsampling. The packed transmission frame may be HEVC-encoded and then transmitted to a receiver (compression (L16070)). The receiver according to an embodiment of the present invention may receive the encoded frame and HEVC-decode the received frame (decompression (L16080)). A texture image and depth map splitter (L16100) according to an embodiment of the present invention may split the decoded frame (L16090) into a texture image and a depth map. The split texture image and depth map may be restored to an original frame size (L16120) through scaling (L16110). According to an embodiment of the present invention, a synthesized left image (L16130) may be generated using the left image and the depth map for the left image. According to an embodiment of the present invention, a synthesized right image (L16140) may be generated using the right image and the depth map for the right image. According to an embodiment of the present invention, a 3D formatter (L16150) may format a 3D image by combining the synthesized left image with the synthesized right image and then display the 3D image (L16160).

Figure 17:
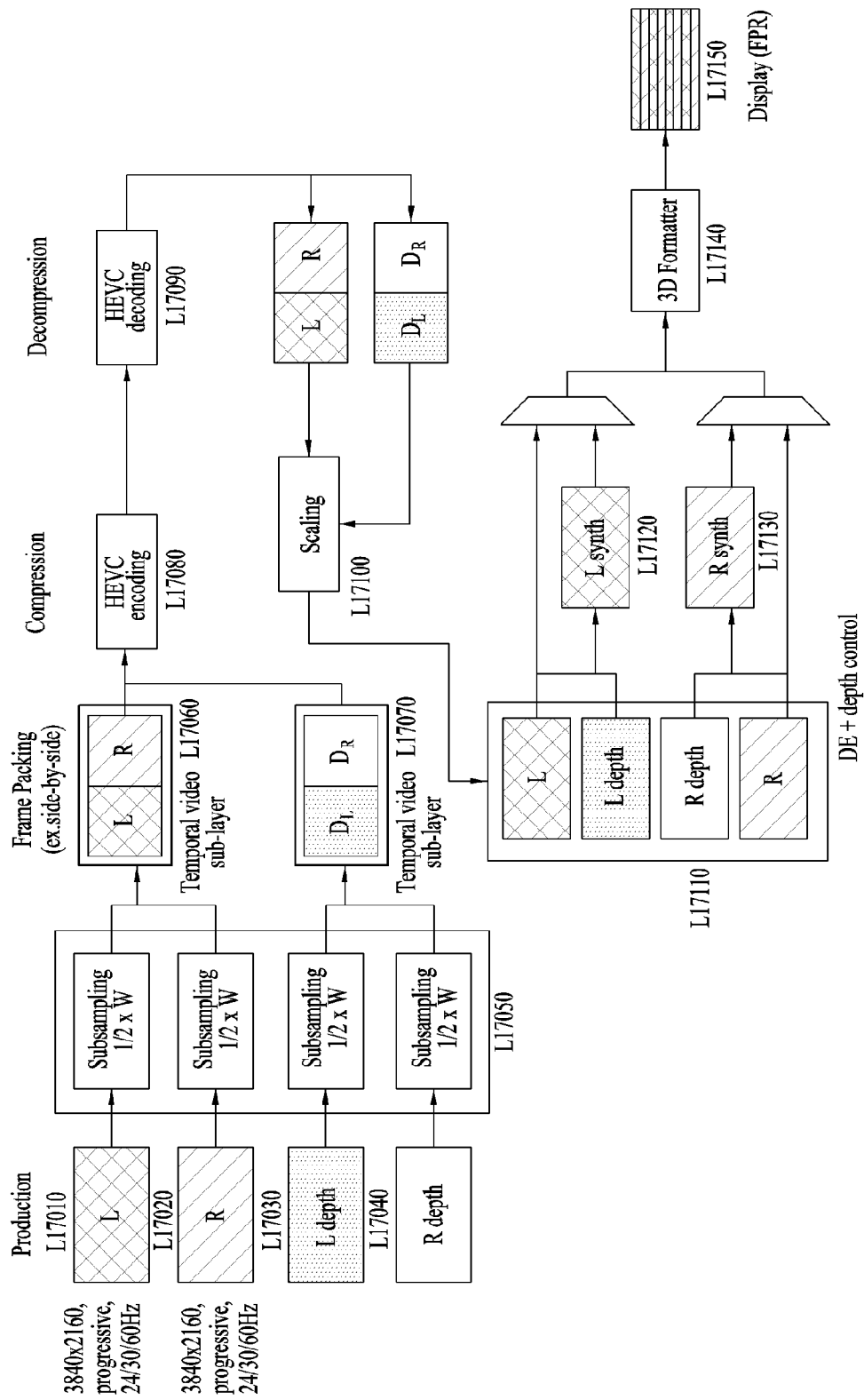
FIG. 17 is a view illustrating a procedure of transmitting a texture image and a depth map to respective layers according to an embodiment (Case 3) of the present invention.

FIG. 17 is a view illustrating a procedure of transmitting a texture image and a depth map to respective layers according to an embodiment (Case 3) of the present invention.

According to an embodiment of the present invention, a 4K-level left image (L17010), a 4K-level right image (L17020), a 4K-level depth map (L17030) for the left image, and/or a 4K-level depth map (L17040) for the right image, produced during a production step, may be subsampled. (L17050) to a frame having ½ width. The left image and/or the right image of the production step may corresponding to a video image having a resolution of 3840×2160, progressive scanning, and a frame rate of 24/30/60 Hz. The subsampled left image and right image may be packed into one container frame in a side-by-side form and the depth map for the left image and the depth map for the right image may be packed into one container frame (L17060 and L17070). In this case, the texture images and the depth maps may be included in different layers. According to another embodiment of the present invention, if the left image, right image, depth map for the left image, and/or depth map for the right image of the production step are produced to an HD level, they may be packed into one 4K-level frame without the above-described subsampling process. The subsampling according to an embodiment of the present invention may have the same meaning as downsampling. The container frame (L17060) including the texture images and the container frame (L17070) including the depth maps may be HEVC-encoded and then transmitted to the receiver (compression (L17080)). The receiver according to an embodiment of the present invention may receive the encoded frame and HEVC-decode the received frame (decompression (L17090)). The decoded container frames may be restored to an original frame size (L17110) through scaling (L17100). According to an embodiment of the present invention, a synthesized left image (L16120) may be generated using the left image and the depth map for the left image. According to an embodiment of the present invention, a synthesized right image (L17130) may be generated using the right image and the depth map for the right image. According to an embodiment of the present invention, a 3D formatter (L17140) may format a 3D image by combing the synthesized left image with the synthesized right image and then display the 3D image (L17150).

Figure 18:
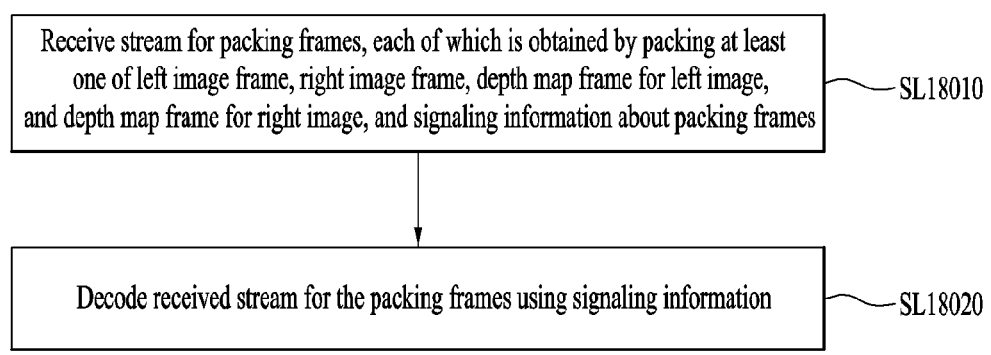
FIG. 18 is a view illustrating a method of receiving a broadcast signal according to an embodiment of the present invention.

FIG. 18 is a view illustrating a method of receiving a broadcast signal according to an embodiment of the present invention.

The method of receiving the broadcast signal according to an embodiment of the present invention may include receiving a stream for packing frames, each of which is obtained by packing at least one of a left image frame, a right image frame, a depth map frame for a left image, and a depth map frame for a right image, and signaling information about the packing frames (SL18010) and/or decoding the received stream for the packing frames (SL1020) using the signaling information (S18020). Herein, the packing frames may be referred to as transmission frames or container frames. A detailed description thereof has been given with reference to FIGS. 3, 4, 5, 6, 7, 8, and 16.

According to another embodiment of the present invention, among the packing frames, a texture packing frame obtained by packing the left image frame and the right image frame and a depth map packing frame obtained by packing the depth map frame for the left image and the depth map frame for the right image may be transmitted in different layers. A texture image may mean the left image and/or the right image. A detailed description thereof has been given with reference to FIGS. 9, 10, 11, and 17.

According to another embodiment of the present invention, the signaling information may include frame packing arrangement information indicating how the packing frames are configured. The frame packing arrangement information may include information about arrangement types of the packing frames. The arrangement types may include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and/or a type of arranging the left image and the depth map for the left image in a vertical or horizontal direction in an odd packing frame divided into two regions and arranging the right image and the depth map for the right image in a horizontal or vertical direction in an even packing frame divided into two regions. Herein, the frame packing arrangement information may indicate Frame_packing_arrangement_for_auto_stereoscopic( ). The information about arrangement types of the packing frames may indicate frame_packing_arrangement_type_for_auto_stereoscopic.

The arrangement types may indicate side-by-side, top-and-bottom, and time interleaving types. A detailed description thereof will be given later with reference to FIG. 12.

According to another embodiment of the present invention, the frame packing arrangement information may include frame packing composition information including information about formats of the left image frame, the right image frame, the depth map frame for the left image, and/or the depth map frame for the right image. The frame packing composition information may indicate frame_packing_composition_info( ). A detailed description thereof has been given later with reference to FIG. 13.

According, to another embodiment of the present invention, the frame packing composition information may include information as to how each component in a color space for each pixel constituting the packing frames is configured. Herein, the information as to how each component in a color space for each pixel constituting the packing frames is configured may indicate pixel_composition_info( ). Each component in the color space may include YCbCr. A detailed description thereof has been be given later with reference to FIG. 13.

According to another embodiment of the present invention, the signaling information may include 3D operating point information indicating information about a service for transmitting the texture packing frame and depth map packing frame by different layers and the 3D operating point information may include information for identifying whether a current service is a service for transmitting the texture packing frame and the depth map packing frame by different layers and/or information as to whether each layer included in a service includes the texture packing frame or the depth map packing frame. The 3D operating point information may indicate 3D_operating_point( ). The information for identifying whether the current service is a service for transmitting the texture packing frame and the depth map packing frame by different layers may indicate service_type. The information as to whether each layer included in a service includes the texture packing frame or the depth map packing frame may indicate layer_type. A detailed description thereof will be given later with reference to FIG. 14.

Figure 19:
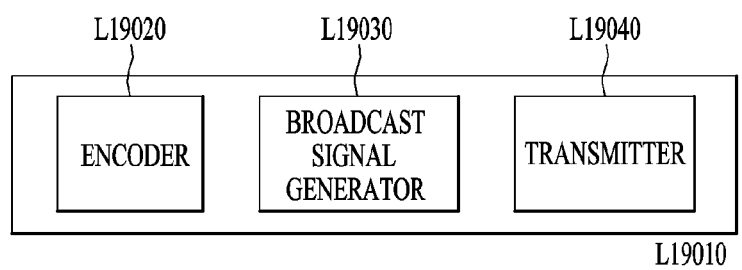
FIG. 19 is a view illustrating the structure of a broadcast signal transmission apparatus according to an embodiment of the present invention.

FIG. 19 is a view illustrating the structure of a broadcast signal transmission apparatus according to an embodiment of the present invention.

A broadcast signal transmission apparatus L19010 according to an embodiment of the present invention may include an encoder L19020, a broadcast signal generator L19030, and/or a transmitter L19040.

The encoder L19020 may encode packing frames and signaling information, wherein each of the packing frames is obtained by packing at least one of a left image frame, a right image frame, a depth map frame for a left image, and a depth map frame for a right image.

The broadcast signal generator L19030 may generate a broadcast signal including the encoded packing frames and signaling information.

The transmitter L19040 may transmit the generated broadcast signal.

According to another embodiment of the present invention, the encoder may encode a texture packing frame obtained by packing the left image frame and the right image frame and a depth map packing frame obtained by packing the depth map frame for the left image and the depth map frame for the right image, among the packing frames, to different layers.

Figure 20:
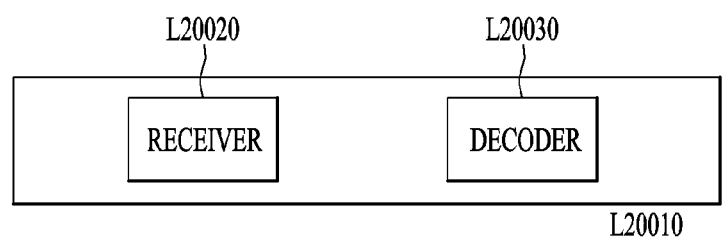
FIG. 20 is a view illustrating the structure of a broadcast signal reception apparatus according to an embodiment of the present invention.

FIG. 20 is a view illustrating the structure of a broadcast signal reception apparatus according to an embodiment of the present invention.

A broadcast signal reception apparatus L20010 may include a receiver L20020 and/or a decoder L20030.

The receiver L20020 may receive a stream for packing frames, each of which is obtained by packing at least one of a left image frame, a right image frame, a depth map frame for a left image, and a depth map frame for a right image, and signaling information about the packing frames.

The decoder L20030 may decode the received stream for the packing frames using the signaling information.

The modules, units, or blocks according to embodiments of the present invention may be processors/hardware for executing consecutive processes stored in a memory (or a storage unit). The steps or methods described in the above-described embodiments may be performed by hardware/processors. The methods proposed by the present invention nay be executed as code. This code may be written in a processor-readable storage medium and, therefore, may be read by a processor provided by an apparatus according to embodiments of the present invention.

While the drawings have been described separately for convenience of description, the embodiments described in the drawings may be combined into a new embodiment. As needed by those skilled in the art, designing a computer-readable recording medium in which a program for implementing the foregoing embodiments of the present invention is recorded falls within the scope of the appended claims and their equivalents.

The apparatus and method according to the present invention are not limited to the above-described embodiments of the present invention. Rather, the embodiments of the present invention may be combined entirely or in part so as to realize variations of the present invention.

The image processing method according to the present invention may be implemented as processor-readable code that can be written in a recording medium readable by a processor included in a network device. The processor-readable recording medium includes any type of recording device in which processor-readable data is stored. Examples of the processor-readable recording medium include a ROM, a RAM, a CD-ROM, a magnetic tape, a floppy disk, an optical data storage device, and a carrier wave (e.g. data transmission over the Internet). The processor-readable recording medium can be distributed over computer systems connected to a network so that processor-readable code is stored therein and executed therefrom in a decentralized manner.

While the present invention has been particularly shown and described with reference to exemplary embodiments thereof, it will be understood by those of ordinary skill in the art that various changes in form and details may be made therein without departing from the spirit and scope of the present invention as defined by the following claims and such modifications and variations should not be understood individually from the technical idea or aspect of the present invention.

The present specification has described product inventions and method inventions and, when necessary, both product inventions and method inventions may be complementarily applicable to each other.

MODE FOR INVENTION

Various embodiments have been described in the best mode for carrying out the invention.

INDUSTRIAL APPLICABILITY

The present invention is applicable to the entire broadcast industry.

The invention claimed is:

1. A method of transmitting a broadcast signal, comprising:
    encoding packing frames, each of which is obtained by packing at least one of a left image frame, a right image frame, a depth map frame for a left image, and a depth map frame for a right image, and signaling information about the packing frames;
    generating a broadcast signal including the encoded packing frames and signaling information; and
    transmitting the generated broadcast signal,
    wherein the signaling information includes frame packing arrangement information indicating how the packing frames are configured,
    wherein the frame packing arrangement information includes information about arrangement types of the packing frames, and
    wherein the arrangement types include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

2. The method according to claim 1, wherein the encoding includes
encoding a texture packing frame obtained by packing the left image frame and the right image frame and a depth map packing frame obtained by packing the depth map frame for the left image and the depth map frame for the right image, among the packing frames, to different layers.

3. The method according to claim 1,
wherein the frame packing arrangement information includes frame packing composition information including information about formats of the left image frame, the right image frame, the depth map frame for the left image, and the depth map frame for the right image.

4. The method according to claim 3,
wherein the frame packing composition information includes information as to how each component in a color space for each pixel constituting the packing frames is configured.

5. The method according to claim 2,
wherein the signaling information includes 3-dimensional (3D) operating point information indicating information about a service for transmitting the texture packing frame and depth map packing frame by different layers, and
the 3D operating point information includes information for identifying whether a current service is a service for transmitting the texture packing frame and the depth map packing frame by different layers and information as to whether each layer included in a service includes the texture packing frame or the depth map packing frame.

6. A method of receiving a broadcast signal, comprising:
receiving a stream for packing frames, each of which is obtained by packing at least one of a left image frame, a right image frame, a depth map frame for a left image, and a depth map frame for a right image, and signaling information about the packing frames; and
decoding the received stream for the packing frames using the signaling information,
wherein the signaling information includes frame packing arrangement information indicating how the packing frames are configured,
wherein the frame packing arrangement information includes information about arrangement types of the packing frames, and
wherein the arrangement types include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

7. The method according to claim 6, wherein a texture packing frame obtained by packing the left image frame and the right image frame and a depth map packing frame obtained by packing the depth map frame for the left image and the depth map frame for the right image, among the packing frames, are transmitted in different layers.

8. The method according to claim 6,
wherein the frame packing arrangement information includes frame packing composition information including information about formats of the left image frame, the right image frame, the depth map frame for the left image, and the depth map frame for the right image.

9. The method according to claim 8,
wherein the frame packing composition information includes information as to how each component in a color space for each pixel constituting the packing frames is configured.

10. The method according to claim 7,
wherein the signaling information includes 3-dimensional (3D) operating point information indicating information about a service for transmitting the texture packing frame and depth map packing frame by different layers, and
the 3D operating point information includes information for identifying whether a current service is a service for transmitting the texture packing frame and the depth map packing frame by different layers and information as to whether each layer included in a service includes the texture packing frame or the depth map packing frame.

11. An apparatus for transmitting a broadcast signal, comprising:
an encoder configured to encode packing frames, each of which is obtained by packing at least one of a left image frame, a right image frame, a depth map frame for a left image, and a depth map frame for a right image, and signaling information about the packing frames;
a broadcast signal generator configured to generate a broadcast signal including the encoded packing frames and signaling information; and
a transmitter configured to transmit the generated broadcast signal,
wherein the signaling information includes frame packing arrangement information indicating how the packing frames are configured,
wherein the frame packing arrangement information includes information about arrangement types of the packing frames, and
wherein the arrangement types include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

12. The apparatus according to claim 11, wherein the encoder encodes a texture packing frame obtained by packing the left image frame and the right image frame and a depth map packing frame obtained by packing the depth map frame for the left image and the depth map frame for the right image, among the packing frames, to different layers.

13. An apparatus for receiving a broadcast signal, comprising:
- a receiver configured to receive a stream for packing frames, each of which is obtained by packing at least one of a left image frame, a right image frame, a depth map frame for a left image, and a depth map frame for a right image, and signaling information about the packing frames; and
- a decoder configured to decode the received stream for the packing frames using the signaling information,
- wherein the signaling information includes frame packing arrangement information indicating how the packing frames are configured,
- wherein the frame packing arrangement information includes information about arrangement types of the packing frames, and
- wherein the arrangement types include a type of arranging the left image and the right image in a side-by-side form in a horizontal direction in a packing frame divided into 4 regions and arranging the depth map for the left image and the depth map for the right image in a side-by-side form in a horizontal direction in a remaining region, a type of arranging the left image and the right image in a top-and-bottom form in a vertical direction in a packing frame divided into 4 regions and arranging the depth map for the left image and the depth map for the right image in a top-and-bottom form in a vertical direction in a remaining region, and a type of arranging the left image and the depth map for the left image in a vertical or horizontal direction in an odd packing frame divided into two regions and arranging the right image and the depth map for the right image in a horizontal or vertical direction in an even packing frame divided into two regions.

* * * * *